US012691603B2

(12) United States Patent

Holman et al.

(10) Patent No.: US 12,691,603 B2

(45) Date of Patent: Jul. 28, 2026

(54) CHAINSAW AND LUBRICATION SYSTEM FOR CHAINSAW GUIDE BAR

(71) Applicant: Techtronic Cordless GP, Anderson, SC (US)

(72) Inventors: Christopher Holman, Clemson, SC (US); Ronald Hoffman, Cairo, GA (US); Lance Eckard, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 304 days.

(21) Appl. No.: 18/131,943

(22) Filed: Apr. 7, 2023

(65) Prior Publication Data

US 2023/0321863 A1 Oct. 12, 2023

Related U.S. Application Data

(60) Provisional application No. 63/329,614, filed on Apr. 11, 2022, provisional application No. 63/415,761, filed on Oct. 13, 2022.

(51) Int. Cl.
*B27B 17/12* (2006.01)
*A01G 3/08* (2006.01)
(Continued)

(52) U.S. Cl.
CPC .............. *B27B 17/12* (2013.01); *A01G 3/086* (2013.01); *B27B 17/02* (2013.01); *F16N 7/38* (2013.01); *F16N 11/00* (2013.01); *F16N 15/00* (2013.01)

(58) Field of Classification Search
CPC ......... B27B 17/12; B27B 17/02; F16H 57/05; F16H 57/0423; F16N 11/08; F16N 7/38; F16N 7/06; A01G 3/086
(Continued)

(56) References Cited

U.S. PATENT DOCUMENTS 3,717,221 A * 2/1973 Densow .................. F16N 29/04
184/33
4,321,750 A 3/1982 Sugihara
(Continued)

FOREIGN PATENT DOCUMENTS

BR PI0721684 A2 * 5/2007 ............ B23D 59/00
CH 295454 A 12/1953
(Continued)

OTHER PUBLICATIONS

FR-756690-A English translation; Lion Albert; Jun. 8, 1933.*
(Continued)

*Primary Examiner* — Laura M Lee
(74) *Attorney, Agent, or Firm* — Dority & Manning, P.A.

(57) ABSTRACT

A chainsaw including a lubrication system and guide bar extend from a housing. The lubrication system includes a reservoir at which a lubricant is contained. The reservoir is releasably attachable to a machine drive device. The machine drive device includes a body at which a pump apparatus is positioned. The machine drive device forms an inlet opening in fluid communication with the reservoir. The machine drive device forms an outlet opening at which a conduit is fluidly coupled to receive the lubricant. The conduit forms a conduit outlet through which the lubricant is provided to the guide bar.

15 Claims, 18 Drawing Sheets

(51) Int. Cl.

| | |
|---|---|
| *B27B 17/02* | (2006.01) |
| *F16N 7/38* | (2006.01) |
| *F16N 11/00* | (2006.01) |
| *F16N 15/00* | (2006.01) |

(58) Field of Classification Search
   USPC ...................... 83/100, 177; 30/123.3; 222/91
   See application file for complete search history.

(56) References Cited

U.S. PATENT DOCUMENTS

| | | | | |
|---|---|---|---|---|
| 4,373,265 | A * | 2/1983 | van Halderen | ........ B27G 19/08 |
| | | | | 144/34.2 |
| 4,884,340 | A * | 12/1989 | Newman | ................. B27B 17/12 |
| | | | | 30/122 |
| 4,896,648 | A | 1/1990 | Boller | |
| 5,544,418 | A | 8/1996 | Harada | |
| 5,718,050 | A | 2/1998 | Keller et al. | |
| 5,888,947 | A | 3/1999 | Lambert et al. | |
| 5,934,509 | A * | 8/1999 | Niss | ........................ B67D 1/108 |
| | | | | 222/91 |
| 6,481,509 | B1 | 11/2002 | Yamane et al. | |
| 8,225,907 | B2 | 7/2012 | Soucy et al. | |
| 8,844,678 | B2 | 9/2014 | Ilmarinen | |
| 9,133,983 | B2 | 9/2015 | Kettunen et al. | |
| 9,186,808 | B2 | 11/2015 | Hirabayashi et al. | |
| 9,855,672 | B2 | 1/2018 | Zimmermann et al. | |
| 10,479,952 | B2 | 11/2019 | Heise | |
| 11,852,292 | B2 * | 12/2023 | Kuno | ....................... F16N 11/08 |
| 11,898,700 | B2 * | 2/2024 | Barger | ................... F16N 19/00 |
| 12,240,139 | B2 * | 3/2025 | Burden | ................... B27B 17/02 |
| 12,370,714 | B2 * | 7/2025 | King | ........................ B27B 17/12 |
| 2009/0071754 | A1 * | 3/2009 | McArthur | ............... F16N 27/00 |
| | | | | 184/7.4 |
| 2017/0239835 | A1 * | 8/2017 | Ebner | ..................... B27B 17/12 |
| 2018/0015632 | A1 | 1/2018 | Johansson | |
| 2018/0304489 | A1 | 10/2018 | Cornette et al. | |
| 2021/0339420 | A1 * | 11/2021 | Ebner | ................... B27B 17/086 |
| 2022/0030782 | A1 | 2/2022 | Puoskari | |
| 2023/0271345 | A1 * | 8/2023 | Ebner | ..................... B27B 17/02 |
| | | | | 30/381 |
| 2023/0321863 | A1 * | 10/2023 | Holman | ................. B27B 17/02 |
| | | | | 30/123.4 |
| 2024/0355972 | A1 * | 10/2024 | Yamashita | ........... H10H 20/856 |

FOREIGN PATENT DOCUMENTS

| | | | | | |
|---|---|---|---|---|---|
| CN | 108274540 | A | * | 7/2018 | ............. B27B 17/00 |
| CN | 211362617 | U | | 8/2020 | |
| CN | 217703765 | U | | 11/2022 | |
| DE | 908296 | C | * | 7/1949 | |
| DE | 3542476 | A1 | | 6/1987 | |
| DE | 9311081 | U1 | | 3/1993 | |
| DE | 29519574 | U1 | * | 5/1997 | ............. B27B 17/12 |
| DE | 102022127564 | A1 | * | 4/2024 | ............... B25F 5/02 |
| EP | 2828048 | B1 | | 5/2016 | |
| EP | 3135447 | A1 | | 3/2017 | |
| EP | 3608073 | A2 | | 2/2020 | |
| FR | 756690 | A | * | 6/1933 | ............. F16H 57/05 |
| JP | 20019010824 | A | | 1/2001 | |
| WO | WO2010149338 | A1 | | 12/2010 | |
| WO | WO2012169943 | A1 | | 12/2012 | |
| WO | WO2021/251883 | A1 | | 12/2021 | |
| WO | WO2022/058139 | A1 | | 3/2022 | |
| WO | WO2015053666 | A1 | | 4/2025 | |

OTHER PUBLICATIONS

DE-29519574-U1 English translation; May 15, 1997; Dolmar GmBH.*
European Search Report Corresponding to Application No. 24169413 on Jul. 11, 2024.
European Search Report Corresponding with Application No. EP23167174 on Jul. 10, 2023 (2 pages).

* cited by examiner

52

524

523

525

521

522

52

522

523

524

521

525

82

80

CHAINSAW AND LUBRICATION SYSTEM FOR CHAINSAW GUIDE BAR

PRIORITY STATEMENT

The present application claims the benefit of priority to U.S. Provisional Patent Application Ser. No. 63/329,614, filed on Apr. 11, 2022, and U.S. Provisional Patent Application Ser. No. 63/415,761, filed on Oct. 13, 2022, the disclosures of which are incorporated by reference herein in their entirety.

FIELD

The present subject matter relates generally to chainsaws, lubrication systems for chainsaws, and chainsaw lubricants.

BACKGROUND

Chainsaws typically include a guide bar that utilizes a chain provided therearound and which moves relative to the guide bar. Chains typically utilize a plurality of segments each having a cutting surface. As the chain is driven around the chain bar, the cutting surfaces of the chain segments cut into the surface being operated on.

Oil is typically utilized as the lubricant for chains in chainsaws. However, oil can be messy and can leak from the oil pump and/or chainsaw generally.

Accordingly, improved chainsaws, chainsaw lubricants, and lubrication systems for chainsaws are desired in the art. In particular, chainsaw lubricants and lubrication systems which are relatively less messy, improve durability, reduce wear, or improve chain performance would be desired.

BRIEF DESCRIPTION

Aspects and advantages of the invention will be set forth in part in the following description, or may be obvious from the description, or may be learned through practice of the invention.

An aspect of the present disclosure is directed to a chainsaw including a lubrication system and guide bar extending from a housing. The lubrication system includes a reservoir at which a lubricant is contained. The reservoir is releasably attachable to a machine drive device. The machine drive device includes a body at which a pump apparatus is positioned. The machine drive device forms an inlet opening in fluid communication with the reservoir. The machine drive device forms an outlet opening at which a conduit is fluidly coupled to receive the lubricant. The conduit forms a conduit outlet through which the lubricant is provided to the guide bar.

Another aspect of the present disclosure is directed to a lubrication system. The lubrication system includes a machine drive device including a body at which a pump apparatus is positioned. The machine drive device forms an inlet opening in fluid communication with a releasably attachable reservoir at which a lubricant is contained. The machine drive device forms an outlet opening at which a conduit is fluidly coupled to receive the lubricant to flow through a conduit outlet.

Yet another aspect of the present disclosure is directed to a disposable and/or replaceable reservoir or cartridge of lubricant.

Yet another aspect of the present disclosure is directed to a lubricant for a chainsaw, the lubricant including a wax lubricant or a grease lubricant.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
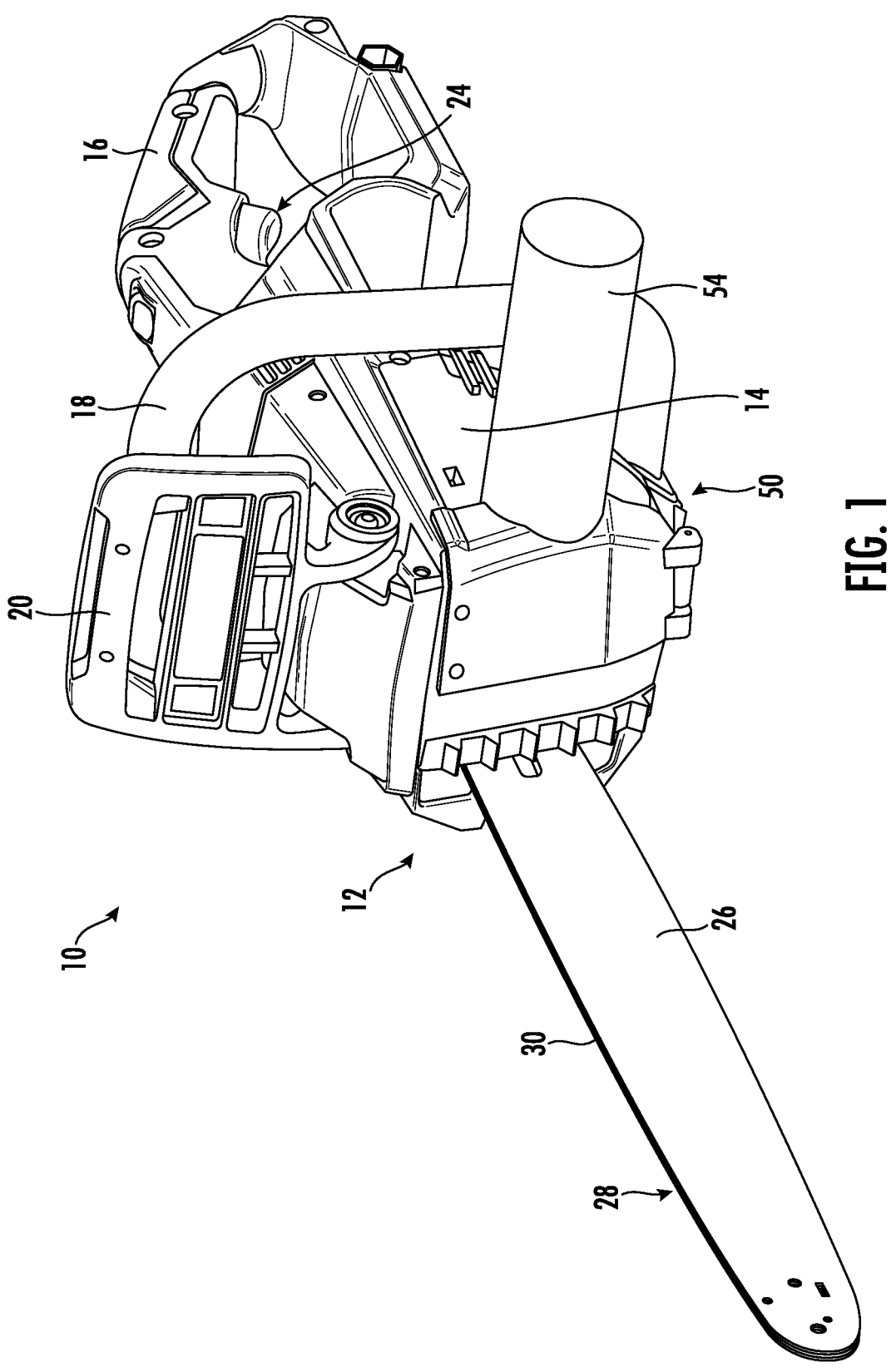
FIG. 1 provides a perspective view of an embodiment of a chainsaw in accordance with aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The present disclosure is generally directed to improved chainsaws, chainsaw lubricants, and lubrication systems. For example, such chainsaws, chainsaw lubricants, and lubrication systems address one or more of the above-identified issues with some known chainsaws.

Referring to the FIGS. 1-9, embodiments of a chainsaw 10 and lubrication system 50 in accordance with aspects of the present disclosure are provided. Referring to FIG. 1, the chainsaw 10 may generally include a body 12. The body 12 may include a housing 14 and one or more handles, such as a rear handle 16 and a front handle 18. In certain embodiments, a guard 20 extends from the housing 14, such as between a guide bar 26 with chain 30 and one or more handles 16, 18. Guard 20 may generally be configured to provide a wall or barrier, such as a protective barrier, between a user (including, e.g., a user's hand) and a cutting tool, such as chain 30. Guard 20 may further include a braking mechanism 22, a trigger 24, and a guide bar 26. The guide bar 26 can extend from the housing 14 and project a distance therefrom. The guide bar 26 can include a track 28 which extends around a perimeter of the guide bar 26. A chain 30 can be guided along the track so as to travel around the guide bar. The chain 30 can include a plurality of connective segments each having at least one cutting surface. The chain 30 can be driven by a drive gear 32 coupled to a motor 34 of the chainsaw 10.

In certain embodiments, the chainsaw 10 includes a tensioning system configured to adjust the location of the guide bar 26 relative to the body 12 to accommodate lengthening of the chain 30. In accordance with one or more embodiments of the present disclosure, the tensioning system allows the operator to take up the slack in the chain 30 which occurs as the chain lengthens.

Embodiments of the chainsaw 10 provided herein may include an electrical power unit or a gas power unit. The electrical power unit may include a battery or capacitor configured to provide energy to operate the chainsaw 30. The present subject matter described herein is not limited to any particular style, model, or configuration of chainsaw. Accordingly, embodiments of the chainsaw 10 may include any appropriate configuration of power unit, tensioning system, guard, braking mechanism, handles, track, or chain, or other known features of a chainsaw.

Referring to detailed and internal views provided in FIGS. 2-9, the chainsaw 10 includes a lubrication system 50 through which a lubricant is flowed, pumped, or otherwise provided for lubricating the chain 30. In some embodiments, the lubricant is a wax-based lubricant or grease-based lubricant. In still some embodiments, the lubricant is an oil-based lubricant. In various embodiments, the lubrication system 50 includes a dispensing apparatus including a reservoir 52 at which the lubricant is contained. The reservoir 52 may include a plastic container, such as including polyethylene or other appropriate material, from which lubricant may be extruded. Referring briefly to FIGS. 4A-4B, the reservoir 52 may form a manifold 521, such as a bag, ribbed structure, or bellows, that may contract, collapse, or deform, such as to promote extrusion of lubricant from the reservoir 52 as further described herein. For instance, reservoir 52 may form a ribbed structure or bellows configured to expand or contract, such as in accordion-type manner, such as may reduce a volume within the reservoir 52 and squeeze or otherwise promote egress of lubricant from within the reservoir 52. Reservoir 52 may form a closed end 522 and an open end 523 separated along a lateral axis. The open end 523 may particularly form an opening 524 through which lubricant egresses, such as further described herein. Open end 523 may further form an attachment interface 525 at which the reservoir 52 is connectable to a machine drive device 56, such as further described herein. In certain embodiments, attachment interface 525 forms a thread configured to interface with a corresponding attachment surface 561 (FIG. 7) at the machine drive device 56. However, it should be appreciated that attachment interface 525 and the corresponding attachment surface 561 may form a fitted interface, such as a press-fit, snap-fit, interference-fit, or other type of fit configured to desirably and releasably attach to the machine drive device 56. The reservoir may be refillable, replaceable, and/or disposable.

The reservoir 52 may be positioned within a reservoir housing 54. The reservoir housing 54 may form a resilient or hardened casing surrounding the reservoir 52. The reservoir housing 54 may form a substantially cylindrical wall extending along a perpendicular direction (e.g., along lateral axis L) or oblique direction co-directional to the reservoir 52 attached to the machine drive device 56. The reservoir housing 54 may accordingly provide a protective layer surrounding the reservoir 52. In some embodiments, the reservoir housing 54 forms a resilient hardened layer relative to the compliant material of the reservoir 52.

In some embodiments, the machine drive device 56 includes a fitting 64 at which the reservoir housing 54 is attachable. The fitting 64 and reservoir housing 54 may together form a locking interface 66 configured to selectively and releasably secure the reservoir housing 54 to the fitting 64. In various embodiments, one or both of the fitting 64 and reservoir housing 54 may include grooves or raised surfaces 541, 641 (FIG. 7) configured to align to one another, such as to mate in a coupling arrangement. In a particular embodiment, the fitting 64 and reservoir housing 54 together form the locking interface as a twist lock, a bayonet fitting, a threaded interface, a tapered fitting, or a quick-disconnect fitting. The quick-disconnect fitting may include hydraulic fittings, such as Zerk fittings or grease fittings. The fitting 64 and housing 54 may include one or more seals positioned therebetween, such as, but not limited to, O-rings, rope seals, epoxy, putty, or other sealant material. In some embodiments, reservoir housing 54 may be removably fixed to body 12 such that, after it is removed from body 12, reservoir 52 may be removed from housing 54 (e.g., through its open end). Accordingly, reservoir 52 may be refilled or replaced as needed or desired.

Body 12 includes the machine drive device 56 at which the reservoir 52 is removably coupled. The machine drive device 56 is configured to suck, pull, or otherwise remove lubricant from reservoir 52. As described above, the reservoir 52 may be formed of a compliant material allowing for reservoir 52 to compress or squeeze as machine drive device 56 sucks lubricant from the reservoir 52. The machine drive device 56 is fluidly connected to a conduit 58. The conduit 58 is fluidly coupled to the machine drive device 56 and configured to dispense lubricant to one or more of the guide bar 26, the chain 30, or other portions of the chainsaw 10 appropriate for receiving lubricant.

Various embodiments of the machine drive device 56 form a pump. In other embodiments, the machine drive device 56 may form a compressor, an impeller, a mechanical flow device, a rotary device, or other device configured to pull, draw, or otherwise flow lubricant from the reservoir 52 to the guide bar 26.

In some embodiments, the machine drive device 56 includes a machine drive device body 60 forming a plenum 62 into which lubricant is provided from the reservoir 52. The machine drive device body 60 forms an outlet opening 601 at which the conduit 58 is attached to the body 60. A pump apparatus 602 is positioned within the body 60 and configured to actuate to generate a vacuum or negative pressure to draw the lubricant from the reservoir 52 into the plenum 62.

Figure 2:
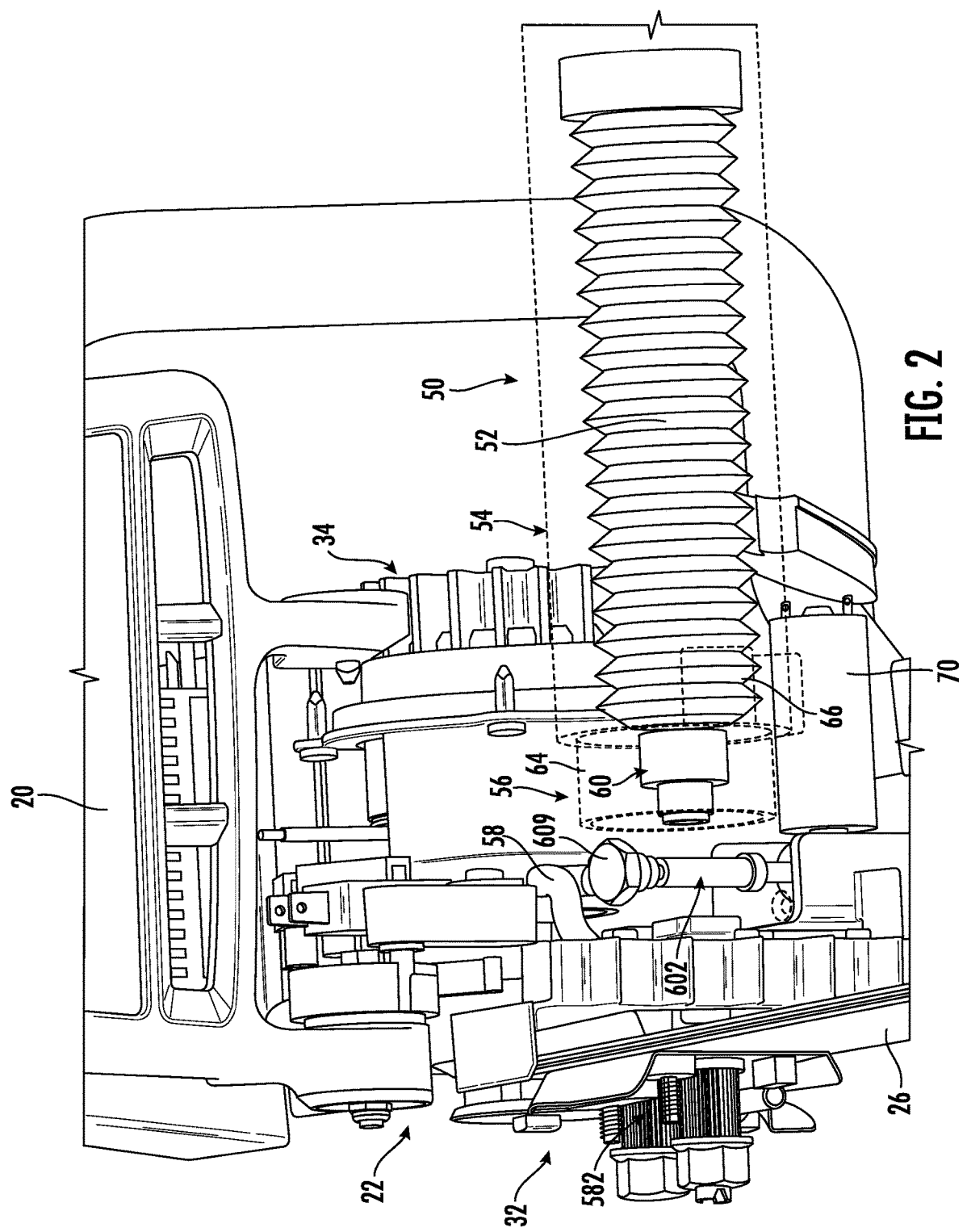
FIG. 2 provides a perspective view of a portion of an embodiment of the chainsaw, in which certain components are omitted for clarity, in accordance with aspects of the present disclosure.
Figure 3:
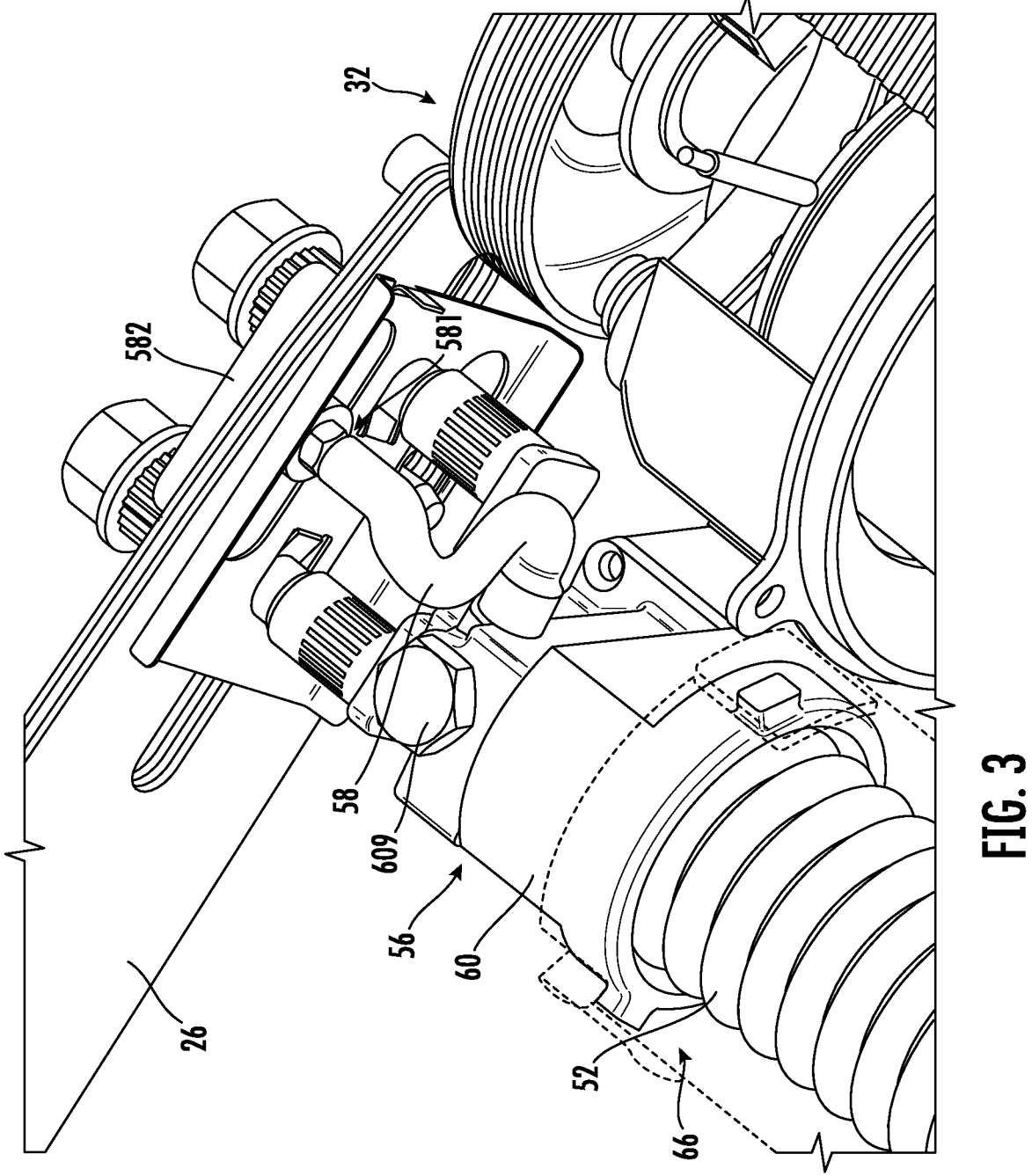
FIG. 3 provides a perspective view of a portion of an embodiment of the chainsaw, in which certain components are omitted for clarity, in accordance with aspects of the present disclosure.
Figures 4A, 4B:
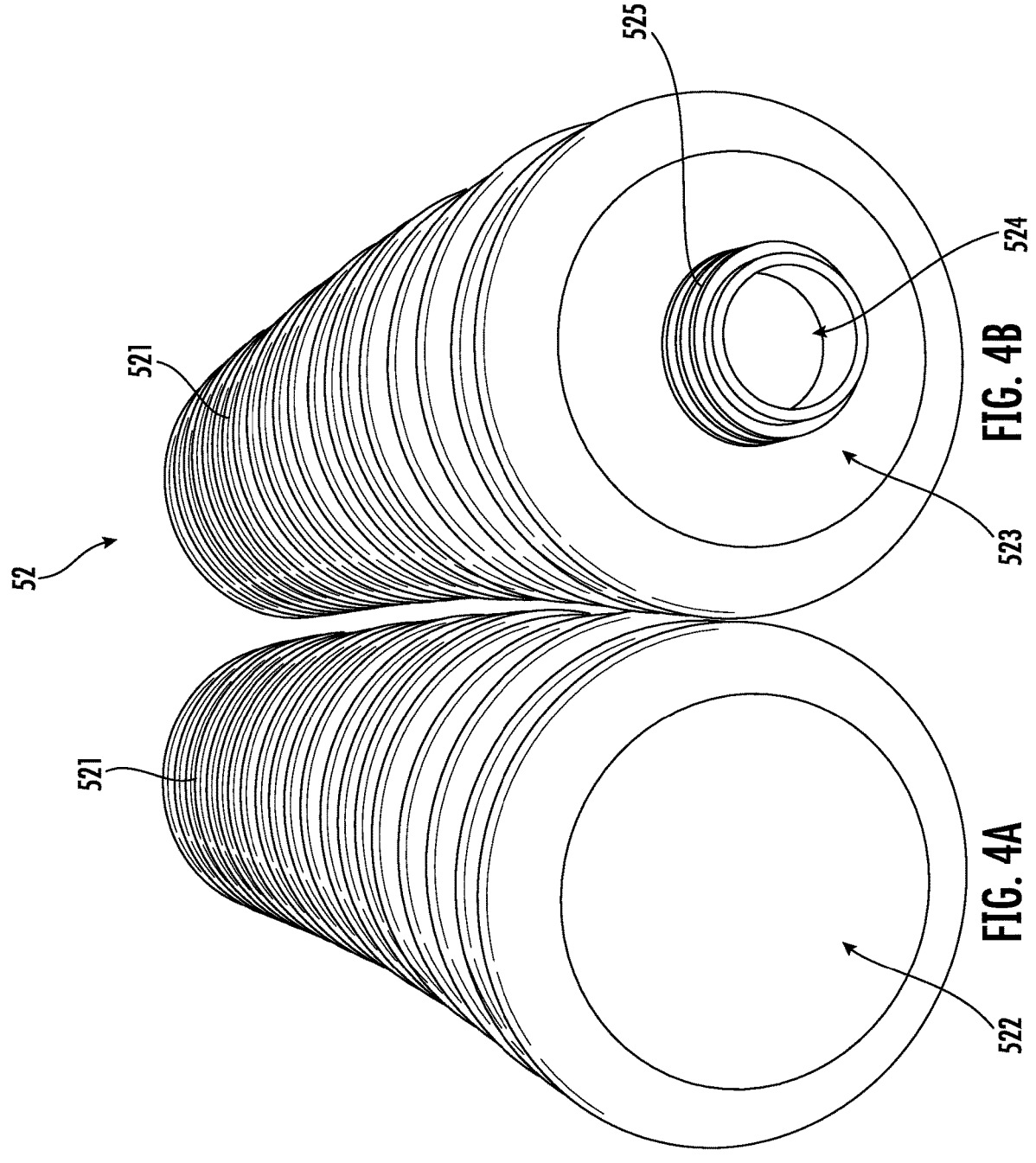
FIG. 4A provides an embodiment of a reservoir for the chainsaw lubricant in accordance with aspects of the present disclosure.
FIG. 4B provides an embodiment of the reservoir for the chainsaw lubricant in accordance with aspects of the present disclosure.
Figure 5:
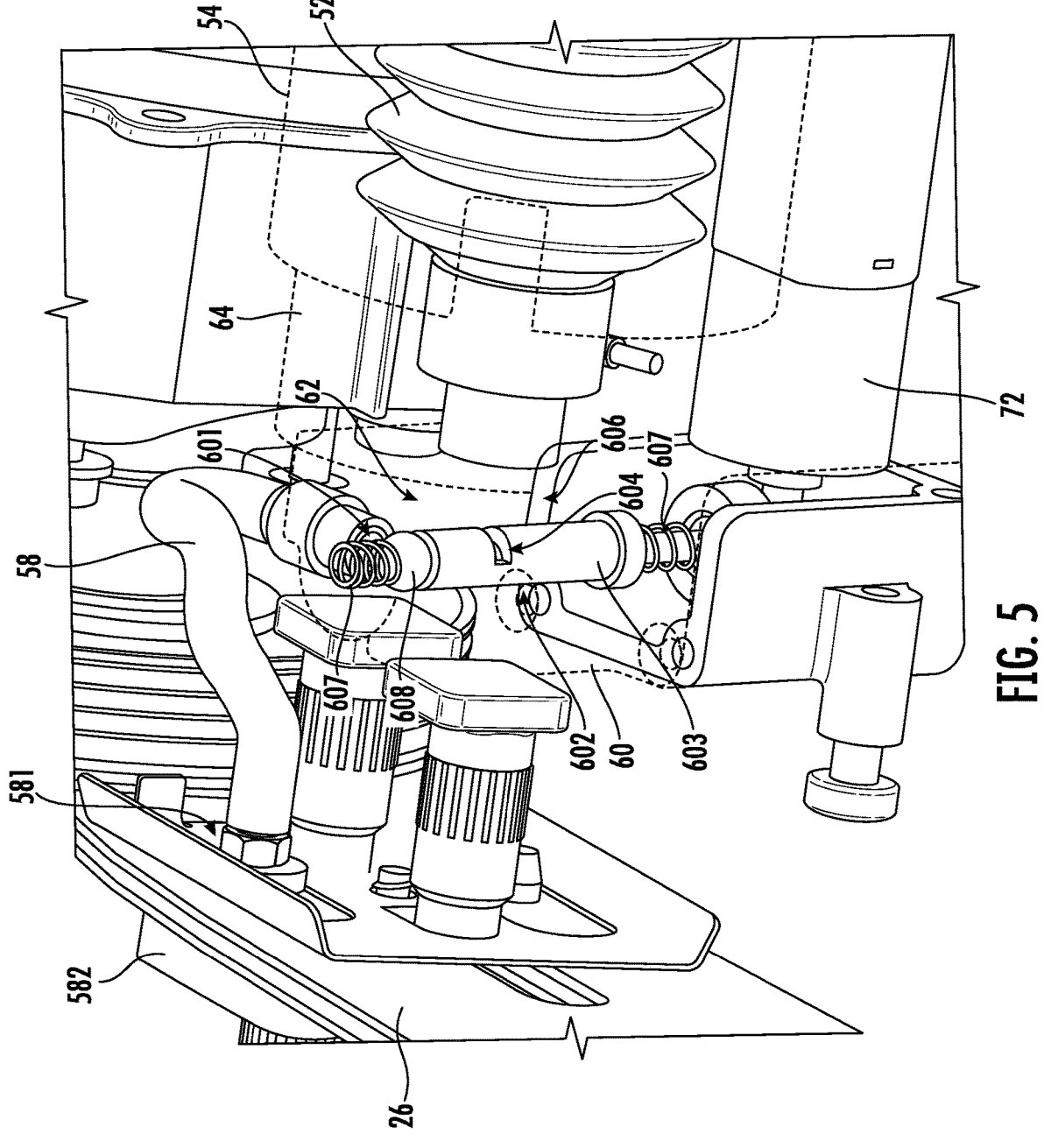
FIG. 5 provides a perspective view of a portion of an embodiment of the chainsaw, in which certain components are omitted for clarity, in accordance with aspects of the present disclosure.
Figure 6:
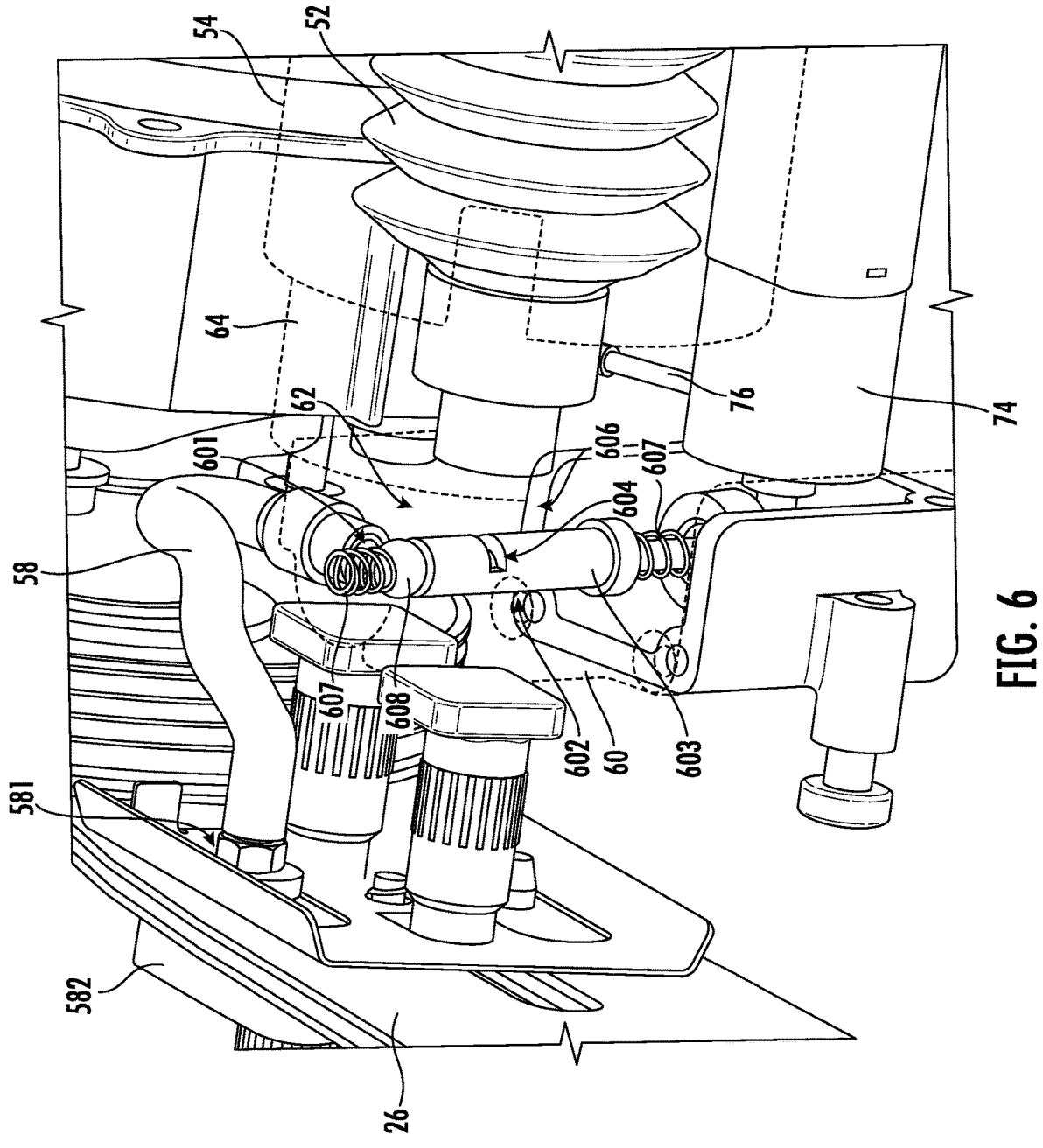
FIG. 6 provides a perspective view of a portion of an embodiment of the chainsaw, in which certain components are omitted for clarity, in accordance with aspects of the present disclosure.

Referring to FIG. 2, a drive system 70 is operably coupled to transmit a motive force to operate the machine drive device 56. Referring to FIG. 5, in some embodiments, the drive system 70 includes a second motor 72 operably coupled to the machine drive device 56 to actuate the pump apparatus 602. The second motor 72 may form any appropriate electric motor and any appropriate method for operable coupling to the pump apparatus 602. However, it should be appreciated that in various embodiments the machine drive device 56 may be operated from the chainsaw motor 34, such as via a series of gears. Referring to FIG. 6, in some embodiments, the chainsaw 10 includes a gear assembly 74 operably coupled to the machine drive device 56 to actuate the pump apparatus 602. The gear assembly 74 may include a drive shaft 76 extending from the motor 34 to drive the machine drive device 56. In some embodiments, the motive force for driving machine drive device 56 may be provided by the chainsaw motor 34, for example, through a series of gears, such that lubrication is pumped via machine drive device 56 to the guide bar 26, track 28, or chain 30, or combinations thereof, whenever the chainsaw motor 34 is run.

Figure 7:
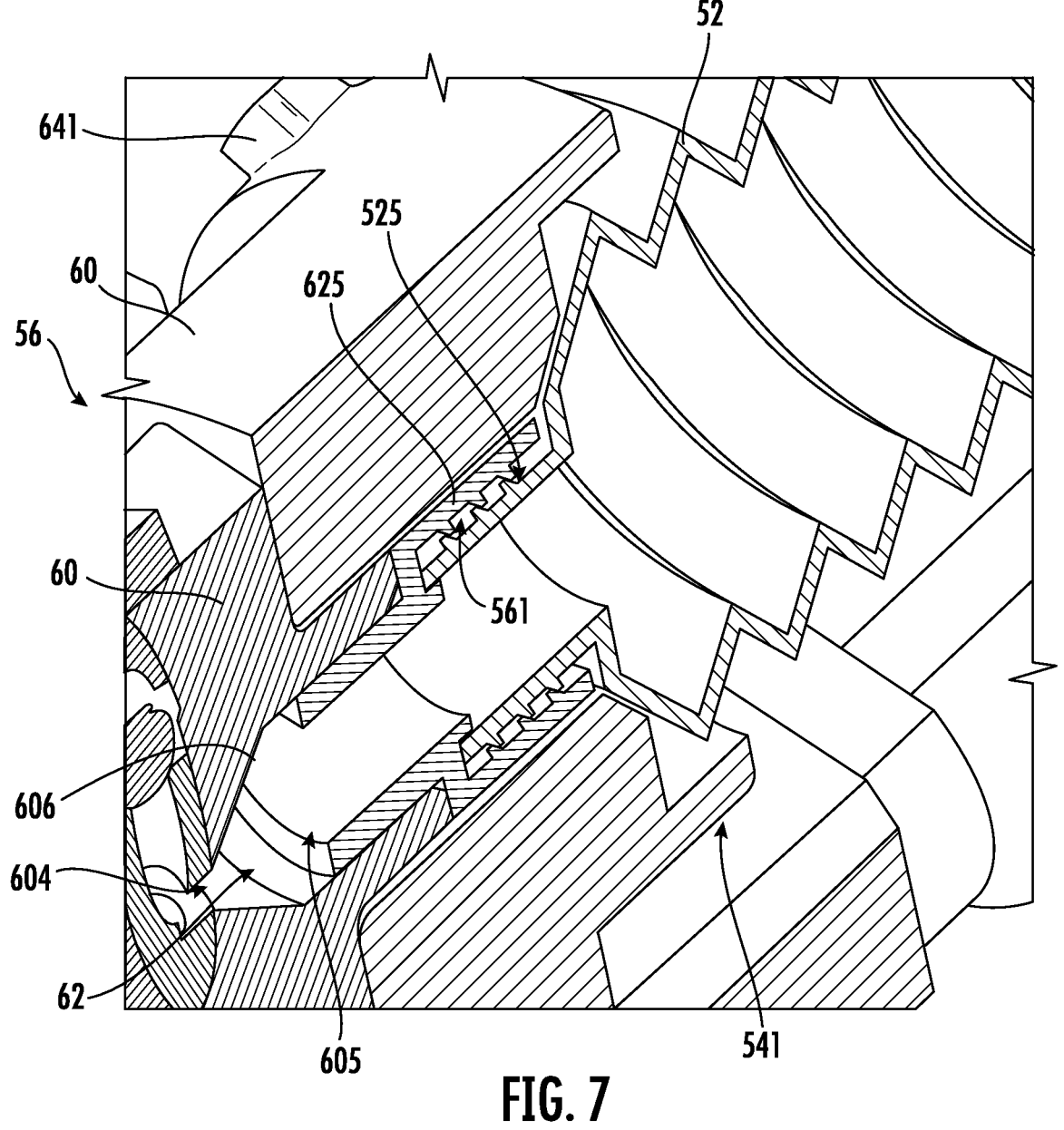
FIG. 7 provides a perspective view of a portion of an embodiment of the chainsaw in accordance with aspects of the present disclosure.
Figure 8:
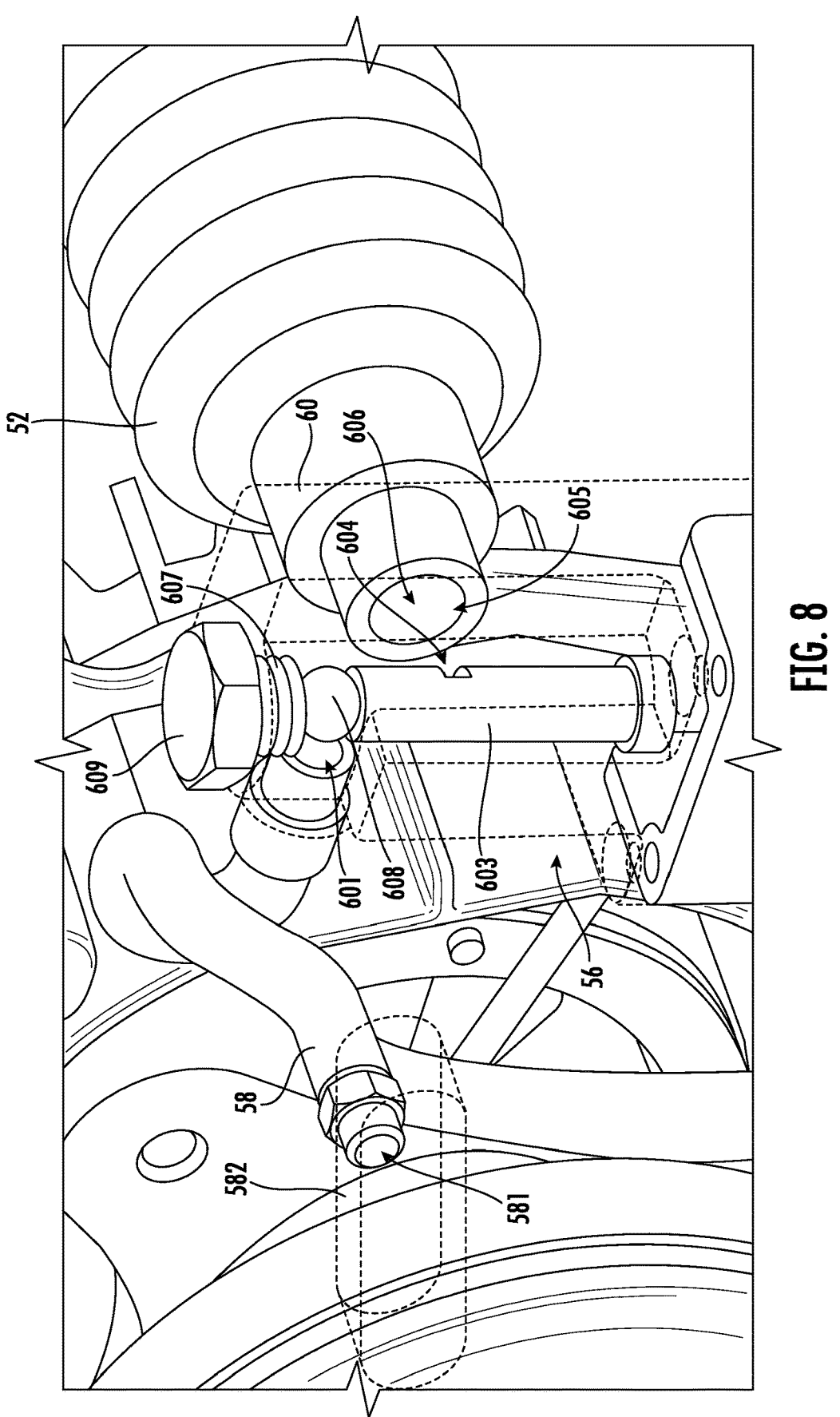
FIG. 8 provides a perspective view of a portion of an embodiment of the chainsaw, in which certain components are omitted for clarity, in accordance with aspects of the present disclosure.

Referring to FIGS. 5-6 and FIG. 8, in various embodiments, the pump apparatus 602 includes a pump body 603 forming a pump opening 604 in fluid communication with the reservoir 52. The machine drive device 56 forms an inlet opening 605 at or proximate to an interface of the reservoir 52 to the machine drive device 56. In certain embodiments, such as depicted in FIG. 7, the machine drive device 56 includes passage walls 606 extending from the inlet opening 605 to the pump opening 604. The passage walls 606 may form a nozzle or converging structure from the inlet opening 605 to the pump opening 604. The converging structure may promote suction, egress, or generating a pressure differential to remove lubricant from the reservoir 52.

In some embodiments, the pump apparatus 602 includes the pump body 603 forming a substantially cylindrical structure or pressure vessel. The pump body 603 may extend along a transverse axis T perpendicular to the lateral axis L along which the reservoir 52 is extended. The pump apparatus 602 may include one or more springs 607 configured to promote or allow articulation of the pump apparatus 602. In certain embodiments, the machine drive device 56 includes a pump shaft 610 through which a piston is extended and configured to drive the lubricant from the inlet opening 605 through the outlet opening 601. Some embodiments of the drive system 70 may include an eccentric element configured to rotate and cyclically drive a piston within the pump shaft 610 to pull the lubricant from the inlet opening 605 through outlet opening 601. The lubricant passing through the outlet opening 601 is delivered to the guide bar 26, track 28, or chain 30, or combinations thereof, for application. In some embodiments, the pump apparatus 602 may include one or more valves 608. The valve 608 may form a wall, a vane, or a ball configured to desirably allow or restrict fluid flow. In some embodiments, valve 608 is configured to interface at outlet opening 601, such as to selectively allow flow of lubricant through pump apparatus 602 through to conduit 58.

In some embodiments, the machine drive device 56 includes a fastener 609 extending to the pump apparatus 602. The fastener 609 may include any appropriate threaded body, such as a threaded shaft, such as a bolt, a screw, a tie rod, etc., or other structure allowing for selective compression and positioning of one or more springs 607 or valve 608. In some embodiments, a user may loosen or tighten, or otherwise articulate, the fastener 609 to adjust a position or articulation of the valve 608. For instance, a position of the fastener 609 relative to the body 60 may be adjusted to adjust a magnitude of compression of the spring 607. The spring 607 may interface with the valve 608. Accordingly, tightening or loosening of the fastener 609 may adjust compression or tension at the spring 607 such as to adjust a frequency of the valve 608 opening or closing the outlet opening 601, such as to adjust an amount or flow rate of lubricant into the conduit 58 and to the guide bar 26, track 28, or chain 30, or combinations thereof.

The conduit 58 includes a conduit outlet 581 through which lubricant is allowed to egress onto certain portions of the chainsaw 10, such as the guide bar 26, the track 28, the chain 30, or combinations thereof.

In some embodiments, the chainsaw 10 may include a lubricant dispenser 582 positioned in fluid communication with the conduit 58. The lubricant dispenser 582 may be configured to receive lubricant from the reservoir 52 through the machine drive device 56 and conduit 58, such as described above. In some embodiments, the lubricant dispenser 582 may receive lubricant that is provided from the conduit 58 to the guide bar 26, the track 28, or the chain 30, or combinations thereof, or receive an excess amount of lubricant that is provided from the conduit 58. In other embodiments, the lubricant dispenser 582 may form a guide track through which the guide bar 26 is extended. The lubricant dispenser 582 may receive lubricant from the conduit 58 and provide surfaces at which the lubricant can build up and be received at the guide bar 26, the track 28, or the chain 30.

Figure 9:
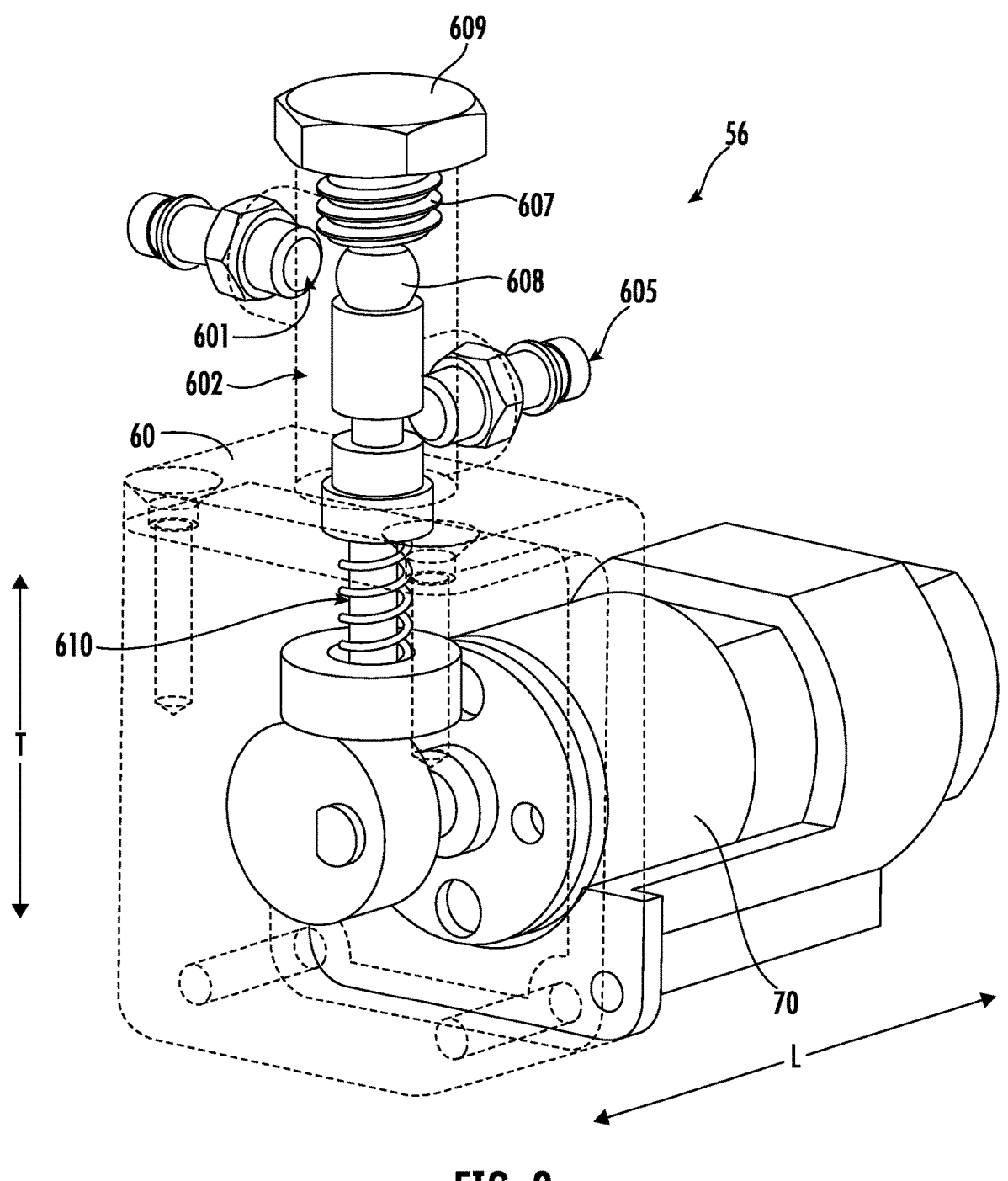
FIG. 9 provides a perspective view of an embodiment of a machine drive device for a chainsaw in accordance with aspects of the present disclosure.
Figure 10:
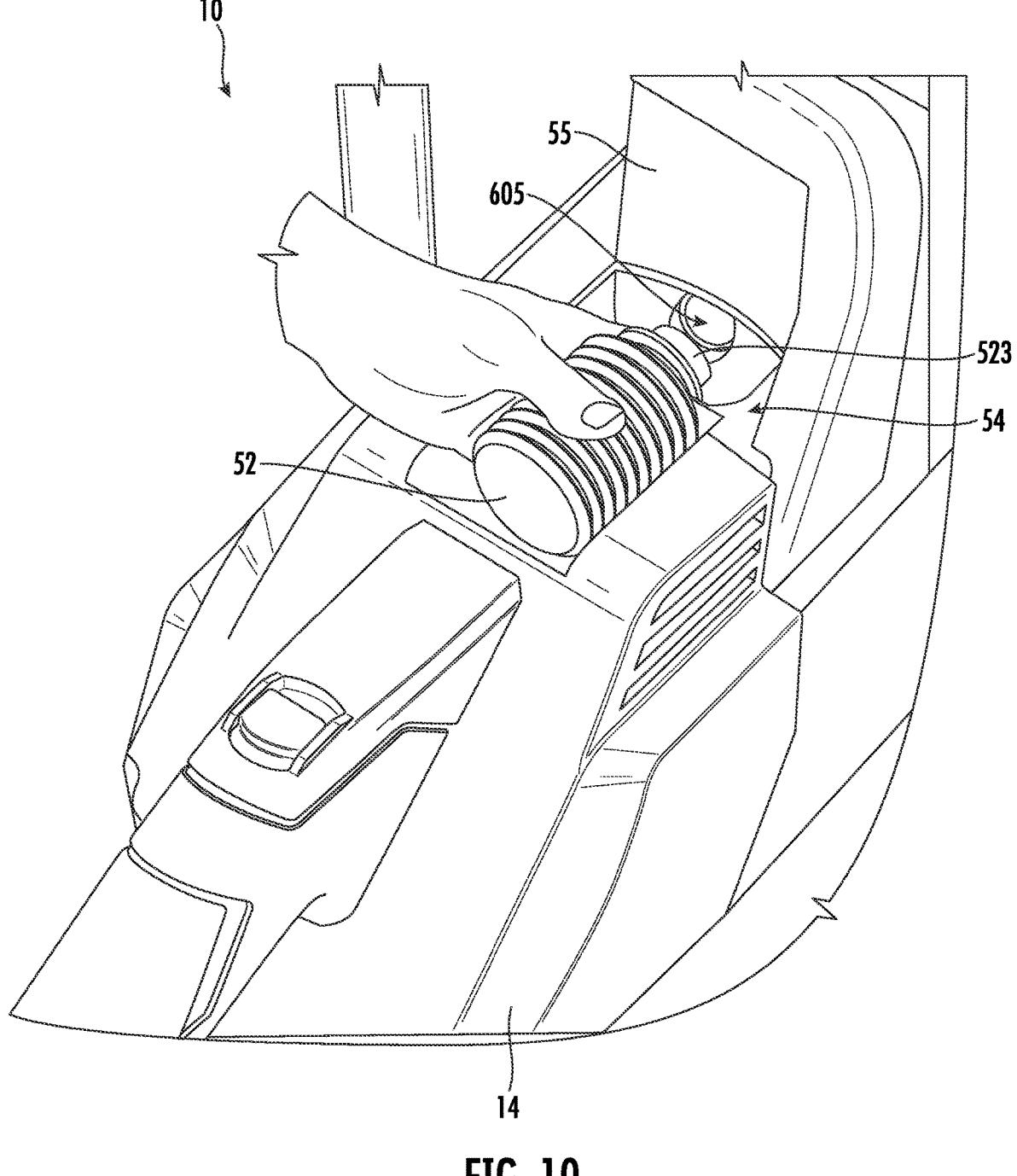
FIG. 10 provides a perspective view of an embodiment of a chainsaw in accordance with aspects of the present disclosure.

Referring now to FIG. 10, a perspective view of an embodiment of the chainsaw 10 is provided. The embodiment of the chainsaw 10 provided in FIG. 10 may be configured substantially as depicted and described in regard to FIGS. 1-9. In FIG. 10, the embodiment of the chainsaw 10 depicted includes the reservoir 52 extending substantially co-directional to an extension of the guide bar 26 (FIG. 1). An embodiment of the reservoir housing 54 may be formed within or at least in part by the body 12 (FIG. 1) of the chainsaw 10. A lid 55 forming an articulatable wall (e.g., pivoting, sliding, translating, or removable wall) allows selective access into the reservoir housing 54 at which the reservoir 52 is positioned.

Referring to FIGS. 9-10, in some embodiments, the lateral axis L may extend along which the drive system 70. In still some embodiments, the lateral axis L may extend substantially co-directional to an extension of the guide bar 26. Opening 605 may extend such that reservoir 52 may attach and extend co-directional to an extension of the guide bar 26 (e.g., along lateral axis L). Opening 601 may be formed at any appropriate position relative to opening 605 at apparatus 602, such as 0 degrees, 90 degrees, 180 degrees, 270 degrees, or any angular position therebetween.

Figure 11:
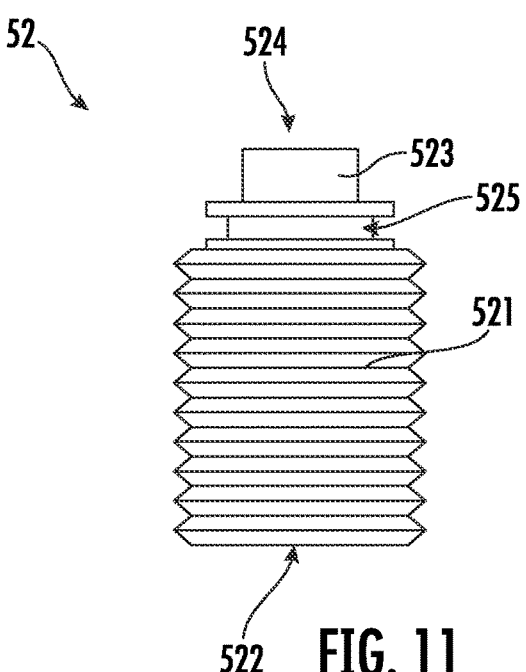
FIG. 11 provides a side view of an embodiment of a reservoir for the chainsaw lubricant in accordance with aspects of the present disclosure.
Figure 12:
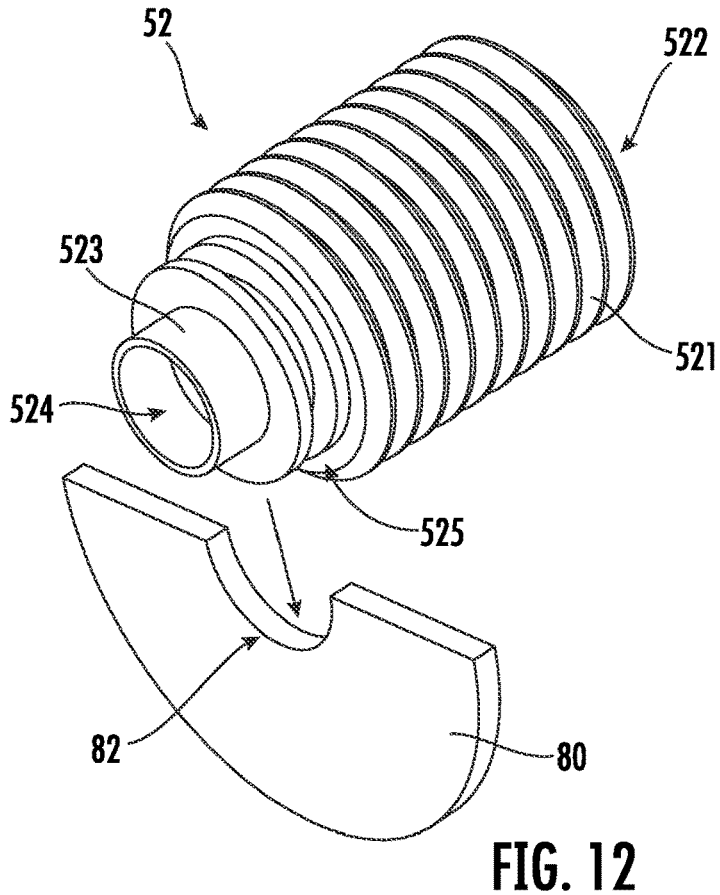
FIG. 12 provides a perspective view of an embodiment of a reservoir for the chainsaw lubricant and positioning interface in accordance with aspects of the present disclosure.
Figure 15:
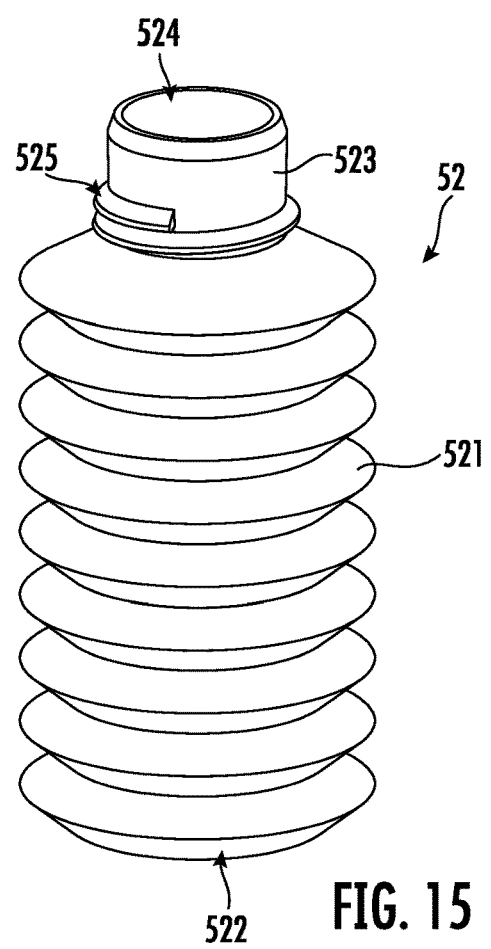
FIG. 15 provides a perspective view of an embodiment of a reservoir for the chainsaw lubricant in accordance with aspects of the present disclosure.

Referring now to FIG. 11, a side view of an embodiment of the reservoir 52 is provided. FIG. 12 provides a perspective view of an embodiment of the reservoir 52 and a positioning interface 82. FIG. 15 provides a perspective view of an embodiment of the reservoir 52. The reservoir 52 may form a receiving interface 525, such as a neck, between the manifold 521 and the open end 523, such as a neck or conduit forming opening 524. The receiving interface 525 may be formed between walls forming stops or detents. The open end 523 may form a neck having a cylindrical or tapered geometry. The open end 523 may form, at least in part, a quick-disconnect fitting, such as a grease fitting or Zerk fitting. One or more seals positioned at the open end 523, such as, but not limited to, O-rings, rope seals, epoxy, putty, or other sealant material. A plate 80 may form the positioning interface 82 at which the receiving interface 525 may be placed by a user. The plate 80 may form the positioning interface 82 as a notch, groove, or indentation extending into the plate 80 to allow the reservoir 52 to position at the plate 80.

Figure 13A:
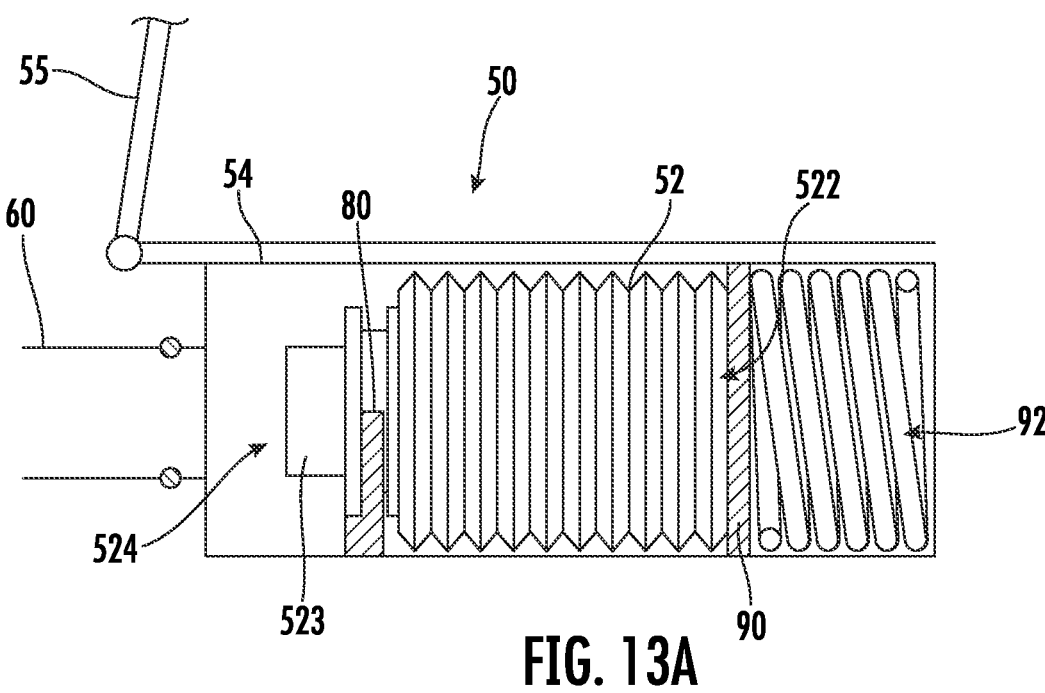
FIG. 13A provides a side view of an embodiment of a lubrication system in a first position in accordance with aspects of the present disclosure.
Figure 13B:
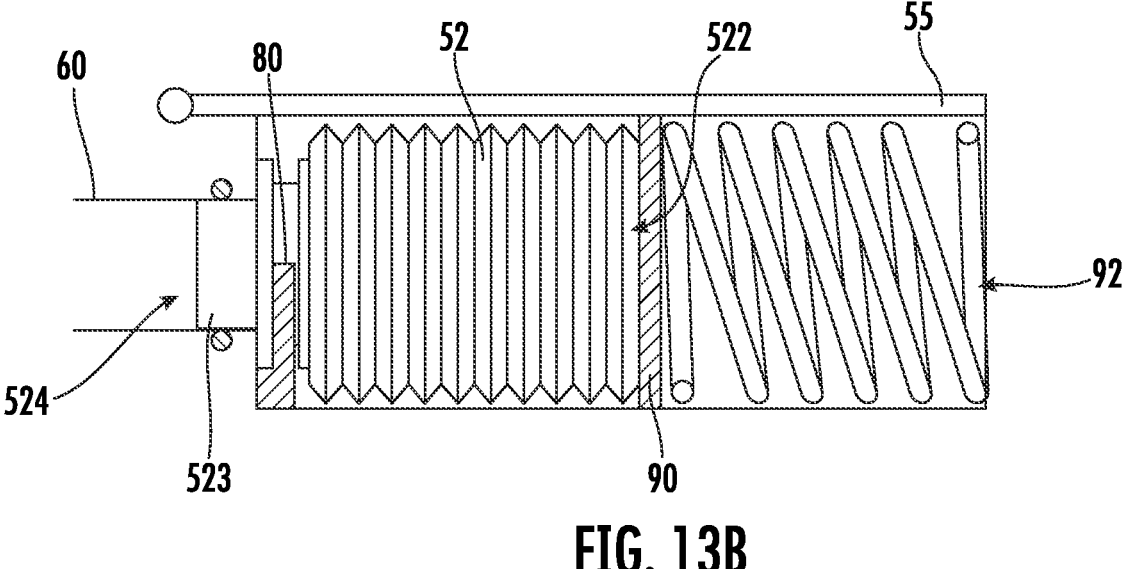
FIG. 13B provides a side view of an embodiment of a lubrication system in a second position in accordance with aspects of the present disclosure.
Figure 14:
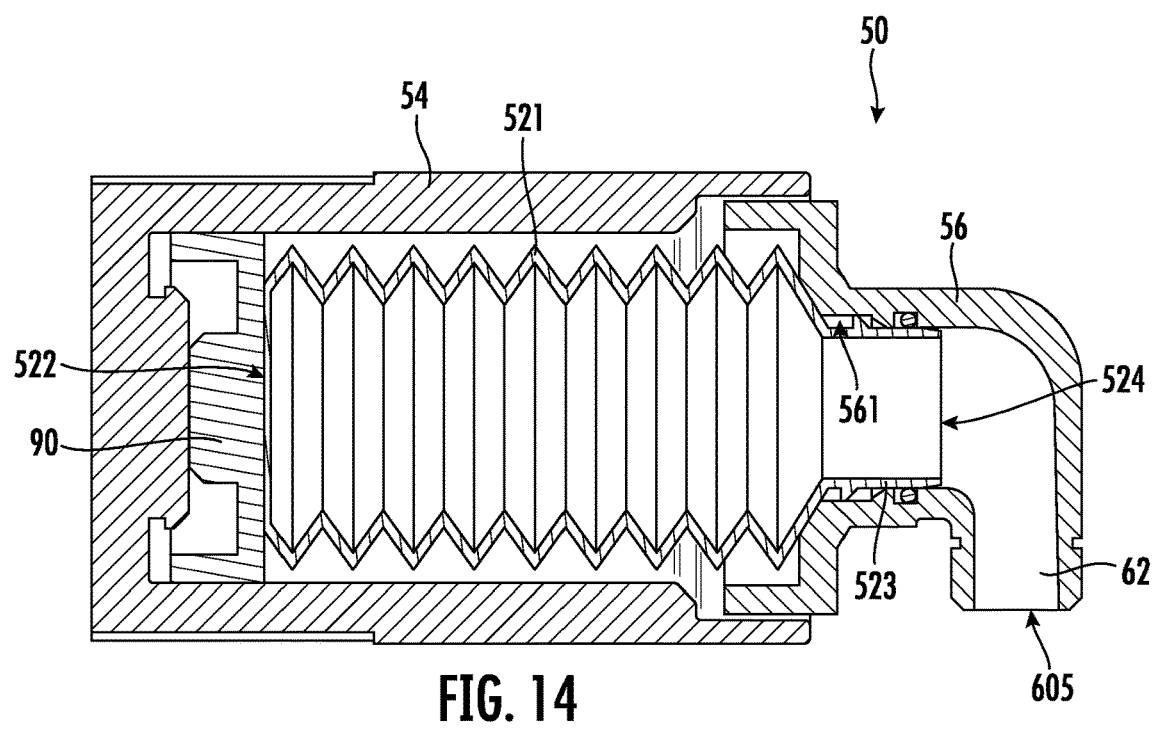
FIG. 14 provides a side cross-sectional view of an embodiment of a lubrication system in accordance with aspects of the present disclosure.

Referring to FIGS. 13A-13B, side views of exemplary embodiments of a portion of the lubrication system 50 are provided. The plate 80 may be positioned within the reservoir housing 54, such as to provide support to the reservoir 52 within the reservoir housing 54. In some embodiments, a spring 92 is positioned within the reservoir housing 54. The spring 92 is configured to exert a force to push the reservoir 52 toward the opening 524. FIG. 13A depicts a first position in which the spring 92 is in a compressed position and the lid 55 is in an open position, such as when a user places the reservoir 52 into the reservoir housing 54. FIG. 13B depicts a second position in which the spring 92 is in an extended position and the lid 55 is in a closed position.

In still some embodiments, a spring plate 90 is positioned between the spring 92 and the reservoir 52, such as to provide a surface at which force from the spring 92 may distribute to the reservoir 52 (e.g., the closed end 522 of the reservoir 52). The plate 80 may be configured to slide along a direction of force from the spring 92 to the reservoir 52. As such, the plate 80 may act as a guide to position the open end 523 into the machine drive device body 60. Plate 80, interfacing surfaces at the reservoir housing 54, or both, may be configured to allow or facilitate sliding of the plate 80 such as described above, such as, but not limited to, low-friction materials or coatings, grooves, or recesses.

Figures 16, 17:
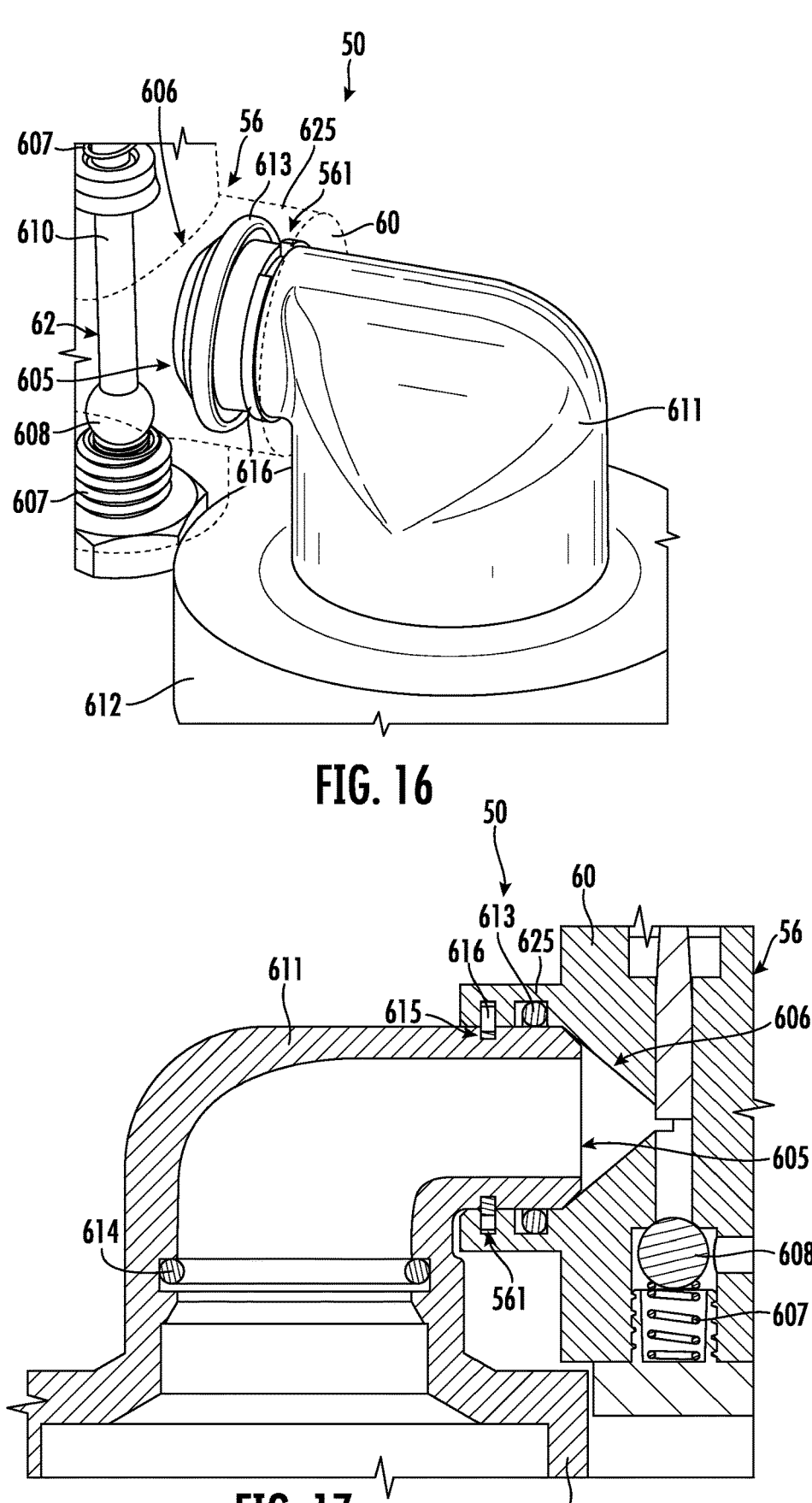
FIG. 16 provides a perspective view of an embodiment of a machine drive device for the chainsaw lubricant in accordance with aspects of the present disclosure.
FIG. 17 provides a side cross-sectional view of an embodiment of a machine drive device for the chainsaw lubricant in accordance with aspects of the present disclosure.

FIG. 16 provides a perspective view of a portion of an embodiment of the lubrication system 50. FIG. 17 provides a side cross-sectional view of a portion of an embodiment of the lubrication system 50. In various embodiments, the lubrication system 50 includes a transition body 611 configured to receive the reservoir 52 and positioned fluidly between the reservoir 52 and the inlet opening 605 of the machine drive device 56. The transition body 611 may form any appropriate flowpath geometry, such as, but not limited to, an L-shaped turn, a straight pipe, a serpentine structure, a U-bend, or other appropriate flowpath geometry. The transition body 611 may include a retainer 612 configured to receive the reservoir 52. A seal 614, such as an O-ring, may be positioned at a first end at which the attachment interface 525 of the reservoir 52 is received through the retainer 612. A seal 613, such as an O-ring, may be positioned at a second end at which the transition body 611 is received at the machine drive body 60, such as at the inlet opening 605.

In some embodiments, the transition body 611 includes a spiral-type retaining ring 616 configured for inner diameter (ID) and outer diameter (OD) locking to provide concealed fastening. For instance, the transition body 611 may include a groove 615 configured to receive the retaining ring 616. The attachment surface 561 at a neck 625 extending from the machine drive device body 60 may form a groove corresponding to the groove 615 at the transition body 611, such as to receive at least a portion of the retaining ring 616. For instance, such as depicted in FIG. 16-17, the retaining ring 616 may form a spiral, partial-circle, or split-ring body extendable into the attachment surface 561 forming a groove at the neck 625 and extendable into the groove 615 at the transition body 611. The retaining ring 616 may form a spring such that ring 616 may compress into the groove 615 during assembly into the neck 625 and expand into the attachment surface 561. The retaining ring 616 may lock the transition body 611 to the neck 625. The seal 613 may further mitigate leakage between the transition body 611 and the neck 625.

Figure 18:
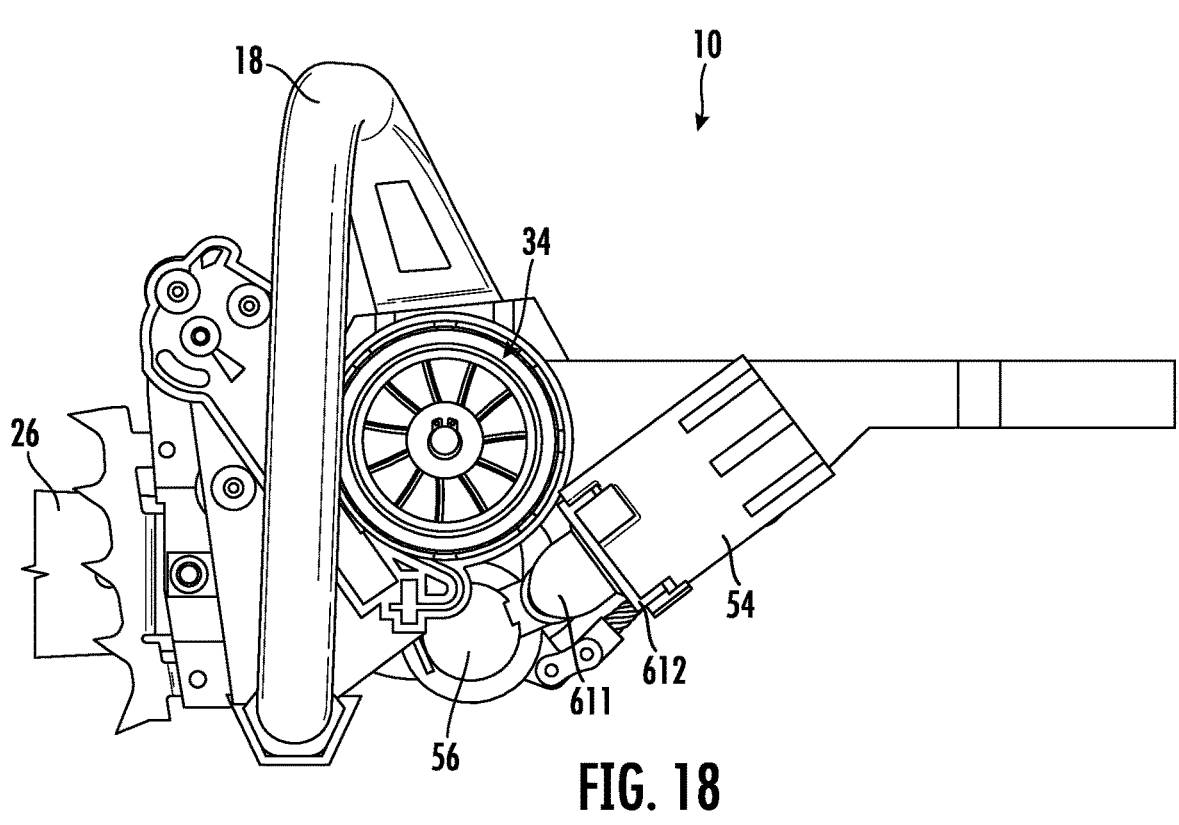
FIG. 18 provides a side view of an embodiment of a chainsaw in accordance with aspects of the present disclosure.
Figure 19:
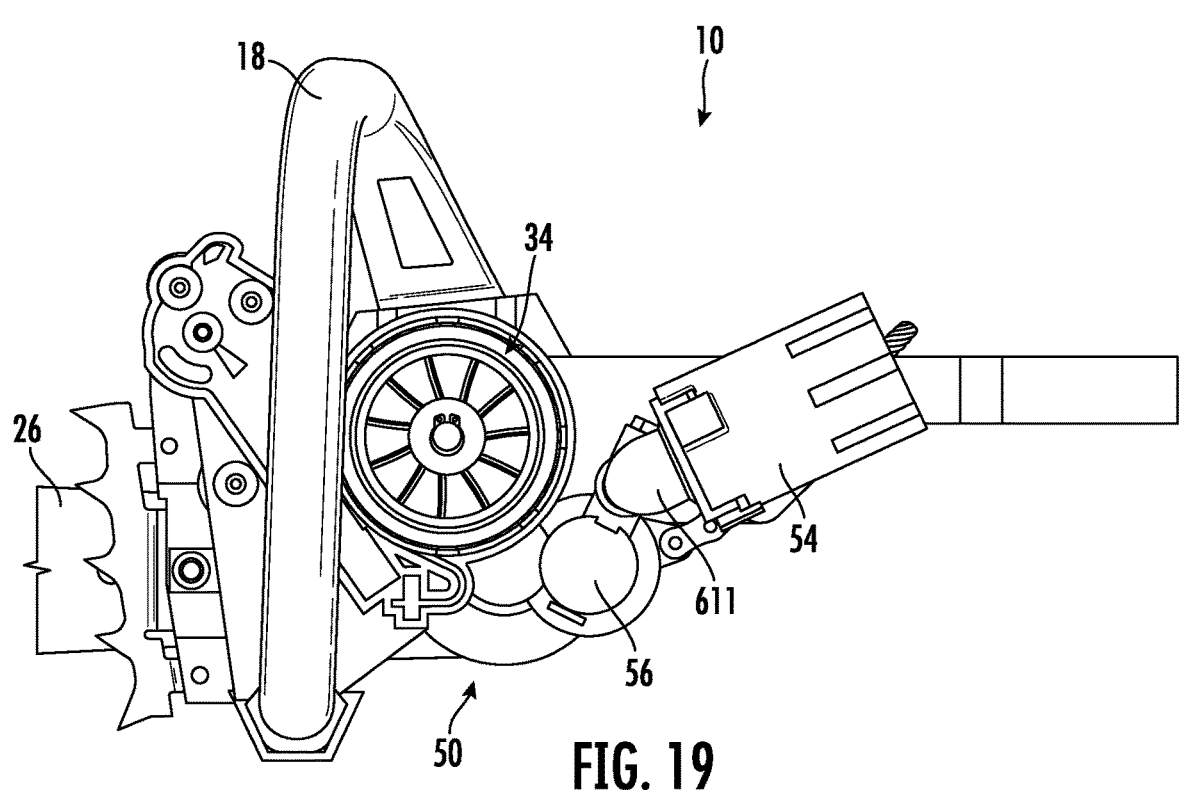
FIG. 19 provides a side view of an embodiment of a chainsaw in accordance with aspects of the present disclosure.
Figure 20:
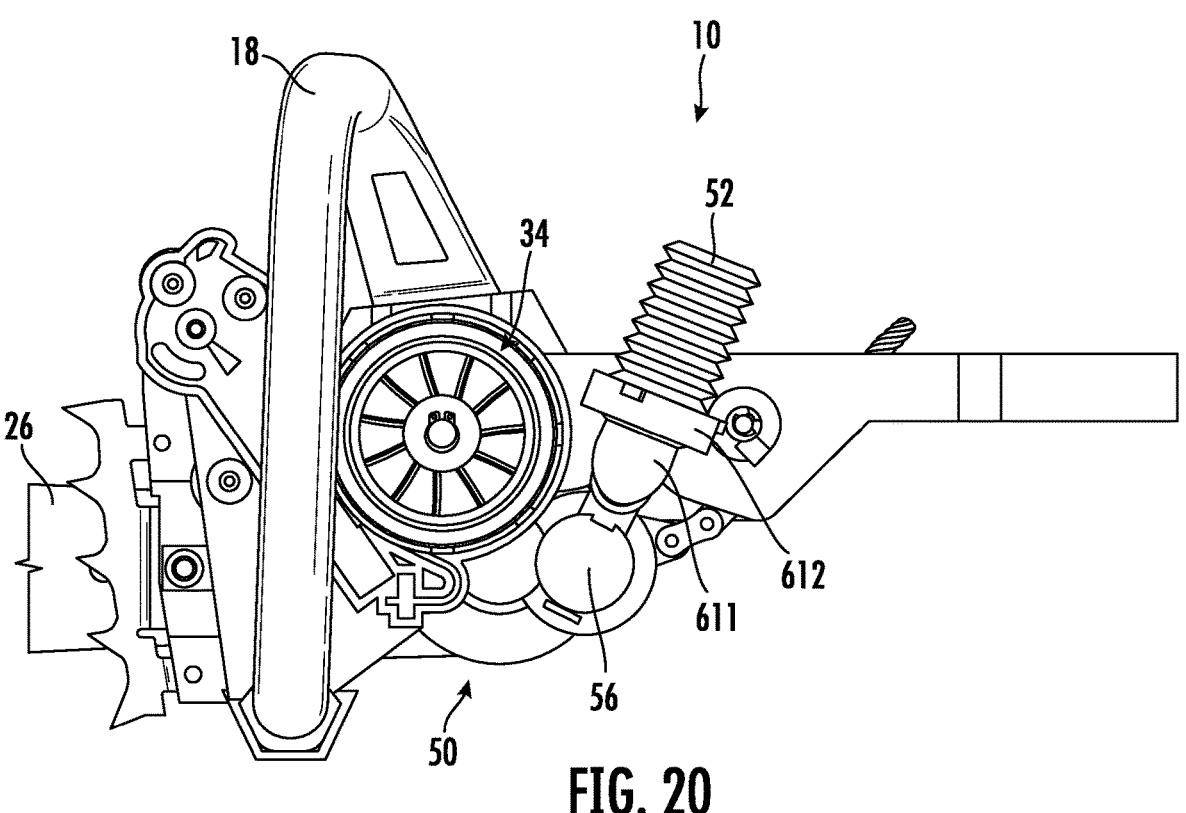
FIG. 20 provides a side view of an embodiment of a chainsaw in accordance with aspects of the present disclosure.
Figure 21:
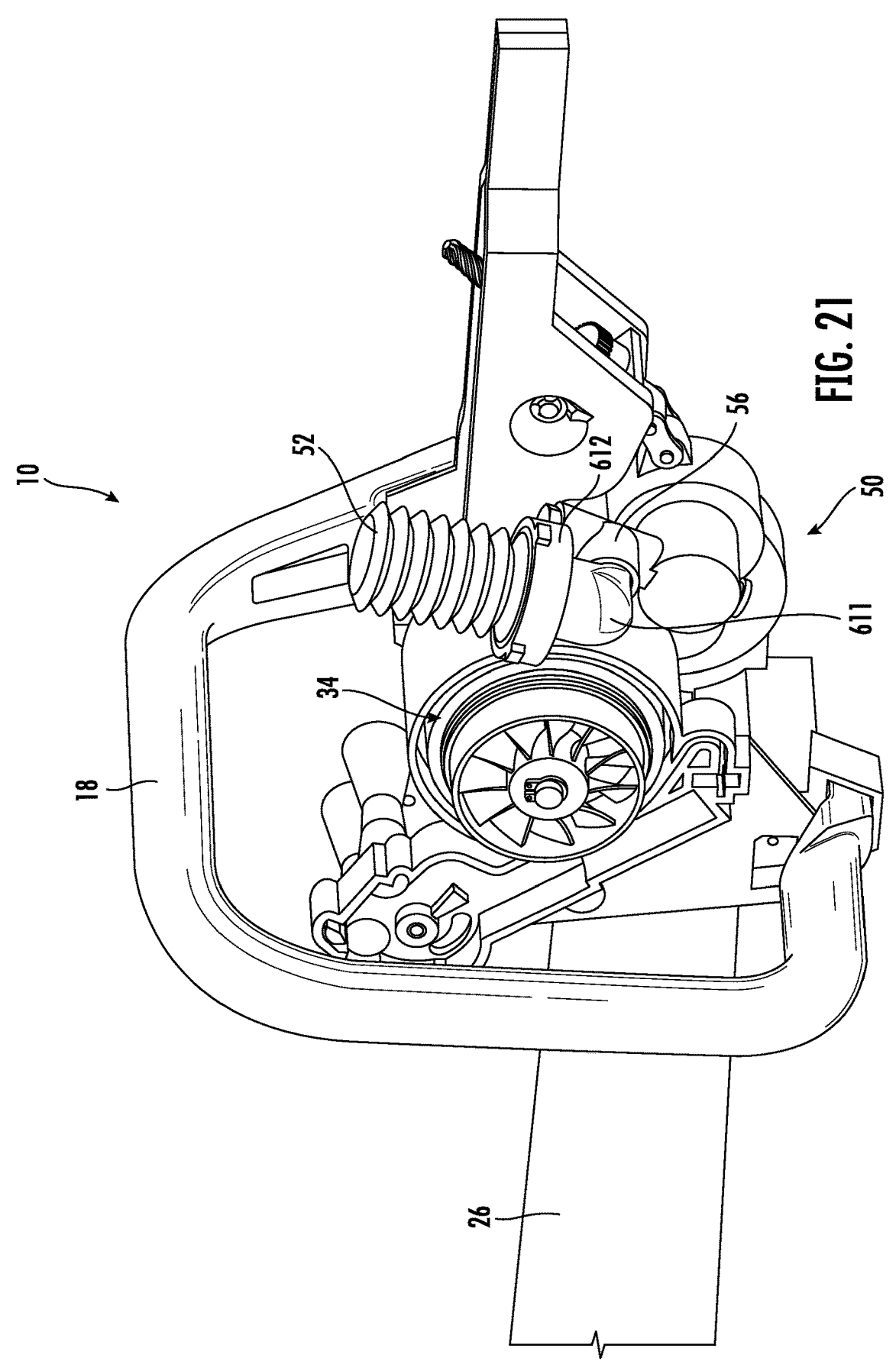
FIG. 21 provides a perspective view of an embodiment of a chainsaw in accordance with aspects of the present disclosure.
Figure 22:
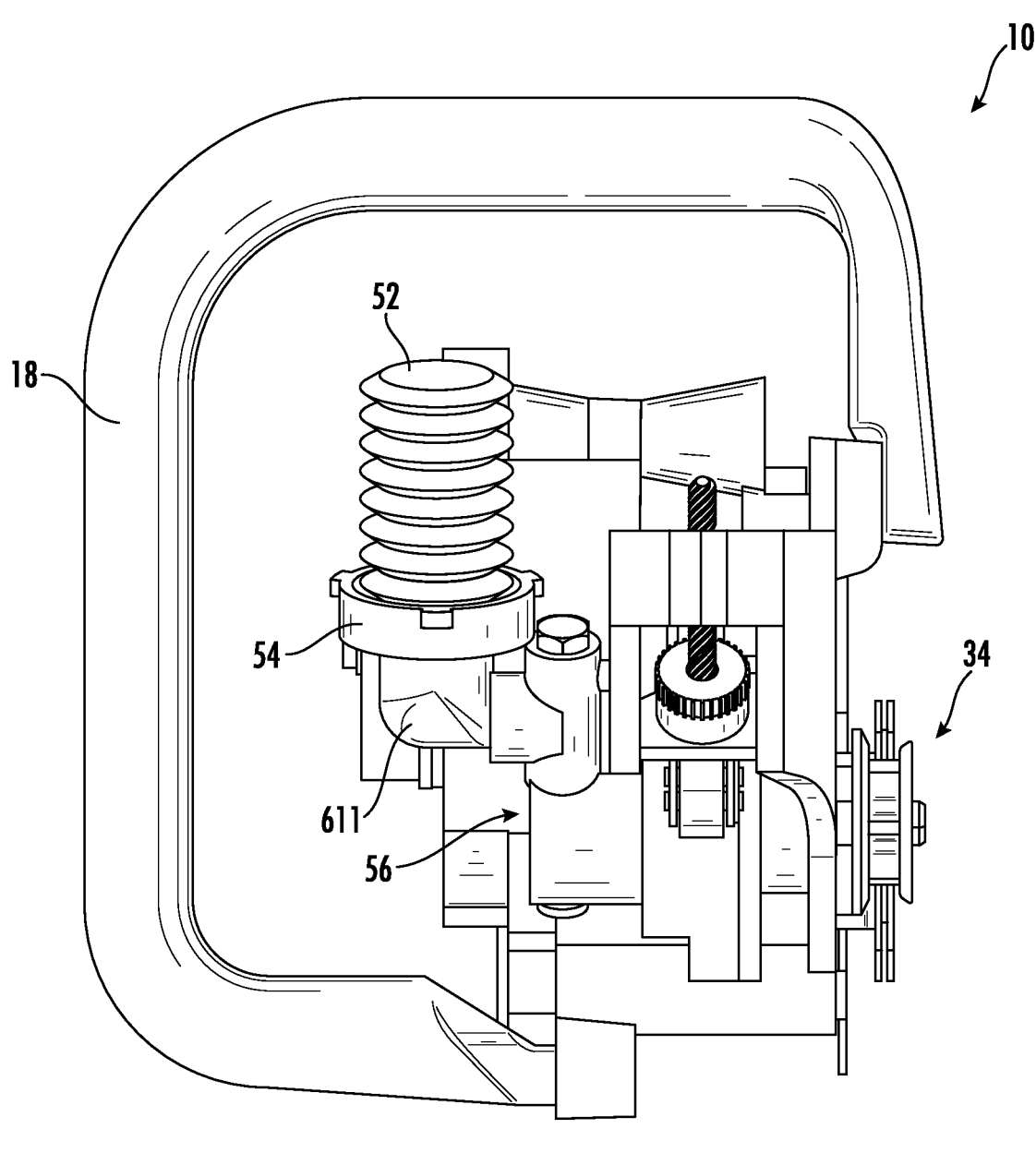
FIG. 22 provides a rear view of an embodiment of a chainsaw in accordance with aspects of the present disclosure.

Referring now to FIGS. 18-22, views of various positions of the lubrication system 50 are provided. The lubrication system 50 may be configured to translate forward (e.g., proximate to handle 18, such as depicted in FIG. 18) to rear (e.g., distal to handle 18, such as depicted in FIG. 19). In some embodiments, the lubrication system 50 may be coupled to a swivel gear assembly allowing the lubrication system 50 to translate or rotate forward and rear. In still some embodiments, the machine drive device 56, or in particular, the machine drive body 60, may be rotatable. For instance, referring to FIGS. 19-22, the reservoir 52 and reservoir housing 54 may be rotatable from a lesser first angular position (such as depicted in FIG. 19) to a greater second angular position (such as depicted in FIGS. 20-22). Various positionings of the lubrication system 50, or portions thereof, may facilitate access, attachment, removal, and replacement of the reservoir 52.

Embodiments of the chainsaw 10 provided herein may utilize an oil-based lubricant, a wax-based lubricant, or a grease-based lubricant at the guide bar 26, the track 28, or the chain 30. Embodiments of the chainsaw 10 configured to utilized a wax or grease lubricant may reduce mess, drippage, pollution, debris, or visual untidiness associated with oil-based lubricants. The reservoir 52 may include a bag or bellows container forming a removable, disposable package containing the wax or grease lubricant or the reservoir itself may be disposable or replaceable. The reservoir 52 may attach directly to the machine drive device 56, or indirectly through a fitting or other connecting interface. In various embodiments, the lubricant is any appropriate wax or grease, such as may include low temperature pumpability, resistance to dripping or other forms of dispersing during high temperature storage, and low bar wear. Embodiments of the chainsaw 10 provided herein may further improve durability, reduce wear, or reduce material loss or deformation at the guide bar 26, the track 28, or the chain 30, or combinations thereof.

Further aspects of the present disclosure are provided in one or more of the following clauses:

1. A chainsaw, the chainsaw including a guide bar extending from a housing, wherein the guide bar includes a track extending around a perimeter of the guide bar configured to receive a chain; a lubrication system including a reservoir at which a lubricant is contained, wherein the reservoir is releasably attachable to a machine drive device, the machine drive device including a body at which a pump apparatus is positioned, wherein the pump apparatus forms an inlet opening in fluid communication with the reservoir, and wherein the machine drive device forms an outlet opening at which a conduit is fluidly coupled to receive the lubricant, the conduit forming a conduit outlet through which the lubricant is provided to the guide bar.

2. The chainsaw of any one or more clauses herein, wherein the lubricant is a wax lubricant or a grease lubricant.

3. The chainsaw of any one or more clauses herein, the chainsaw including a motor operably coupled to the chain to drive the chain at the guide bar.

4. The chainsaw of any one or more clauses herein, the chainsaw including a drive system operably coupled to the machine drive device to actuate the pump apparatus.

5. The chainsaw of any one or more clauses herein, wherein the drive system includes a second motor operably coupled to the machine drive device to actuate the pump apparatus.

6. The chainsaw of any one or more clauses herein, wherein the drive system includes a gear system operably coupled to the motor to transmit power to the machine drive device to actuate the pump apparatus.

7. The chainsaw of any one or more clauses herein, wherein the reservoir extends from the machine drive device perpendicular or oblique to a longitudinal extension of the guide bar.

8. The chainsaw of any one or more clauses herein, wherein the reservoir includes an attachment interface at an open end, the attachment interface forming a threaded interface releasably attachable to a corresponding attachment surface at the machine drive device.

9. The chainsaw of any one or more clauses herein, the chainsaw including a reservoir housing surrounding the reservoir; and a fitting at which the reservoir housing is attachable, wherein the fitting and housing together form a locking interface configured to selectively secure the reservoir housing to the fitting.

10. The chainsaw of any one or more clauses herein, wherein the locking interface forms a twist lock, a bayonet fitting, a threaded interface, a tapered fitting, a quick-disconnect fitting, a tapered fitting, a grease fitting, or a Zerk fitting.

11. The chainsaw of any one or more clauses herein, wherein the fitting is coupled to the body of the machine drive device.

12. The chainsaw of any one or more clauses herein, wherein the reservoir includes a compliant material allowing the reservoir to compress.

13. The chainsaw of any one or more clauses herein, wherein the reservoir includes a polyethylene material.

14. The chainsaw of any one or more clauses herein, wherein the reservoir includes a bellows configured to contract to reduce a volume within the reservoir.

15. A lubrication system, the lubrication system including a machine drive device including a body at which a pump apparatus is positioned, wherein the pump apparatus forms an inlet opening configured to be in fluid communication with a releasably attachable reservoir in which a lubricant is contained, and wherein the machine drive device forms an outlet opening at which a conduit is fluidly coupled to receive the lubricant to flow through a conduit outlet.

16. The lubrication system of any one or more clauses herein, wherein the lubricant is a wax lubricant or a grease lubricant.

17. The lubrication system of any one or more clauses herein, wherein the reservoir includes an attachment interface at an open end, the attachment interface forming a threaded interface releasably attachable to a corresponding attachment surface at the machine drive device.

18. The lubrication system of any one or more clauses herein, the lubrication system including a reservoir housing surrounding the reservoir; and a fitting at which the reservoir housing is attachable, wherein the fitting and housing together form a locking interface configured to selectively secure the reservoir housing to the fitting.

19. The lubrication system of any one or more clauses herein, wherein the locking interface forms a twist lock, a bayonet fitting, a threaded interface, a tapered fitting, a quick-disconnect fitting, a tapered fitting, or a grease fitting.

20. The lubrication system of any one or more clauses herein, wherein the fitting is coupled to the body of the machine drive device.

21. The lubrication system of any one or more clauses herein, wherein the reservoir includes a compliant material allowing the reservoir to compress.

22. The lubrication system of any one or more clauses herein, wherein the reservoir includes a polyethylene material.

23. The lubrication system of any one or more clauses herein, wherein the reservoir includes a bellows configured to contract to reduce a volume within the reservoir.

24. The lubrication system of any one or more clauses herein, the chainsaw including a drive system operably coupled to the machine drive device to actuate the pump apparatus.

25. The lubrication system of any one or more clauses herein, wherein the drive system includes a motor operably coupled to the machine drive device to actuate the pump apparatus.

26. The lubrication system of any one or more clauses herein, wherein the drive system includes a gear system operably coupled to the motor to transmit power to the machine drive device to actuate the pump apparatus.

27. The lubrication system of any one or more clauses herein, the lubrication system including a transition body positioned between a neck extending from the body and the reservoir, the transition body including a groove configured to receive a retaining ring, the neck including an attachment surface configured to receive the retaining ring, wherein the retaining ring is configured to position into the groove and the attachment surface to couple the transition body to the neck.

28. A lubricant for a chainsaw, the lubricant including a wax lubricant or a grease lubricant.

29. The lubricant of any one or more clauses herein, wherein the lubricant includes a low temperature pumpability and resistance to high temperature dispersing.

30. The chainsaw of any one or more clauses herein, the lubrication system including a transition body positioned between a neck extending from the body and the reservoir, the transition body including a groove configured to receive a retaining ring, the neck including an attachment surface configured to receive the retaining ring, wherein the retaining ring is configured to position into the groove and the attachment surface to couple the transition body to the neck.

31. The chainsaw of any one or more clauses herein including the lubrication system of any one or more clauses herein.

32. The chainsaw of any one or more clauses herein including the lubricant of any one or more clauses herein.

33. The lubrication system of any one or more clauses herein including the lubricant of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A chainsaw, the chainsaw comprising:
a guide bar extending from a housing, wherein the guide bar comprises a track extending around a perimeter of the guide bar configured to receive a chain; and
a lubrication system comprising:
a reservoir at which a lubricant is contained, wherein the reservoir is releasably attachable to a machine drive device,
the machine drive device comprising a body at which a pump apparatus is positioned, wherein a neck extends from the body, the neck comprising an attachment surface,
wherein the reservoir fluidly communicates with a transition body extending between the neck and the reservoir, and wherein a retaining ring is received at the transition body and the attachment surface of the neck to retain the transition body to the neck, wherein the retaining ring is configured as a spring compressible into a groove of the transition body and expandable into the attachment surface of the neck to lock the transition body to the neck, and wherein the attachment surface of the neck forms a groove into which the retaining ring is expandable, and
wherein the machine drive device forms an inlet opening in fluid communication with the reservoir, and wherein the machine drive device forms an outlet opening at which a conduit is fluidly coupled to receive the lubricant, the conduit forming a conduit outlet through which the lubricant is provided to the guide bar.

2. The chainsaw of claim 1, wherein the lubricant is a wax lubricant or a grease lubricant.

3. The chainsaw of claim 1, the chainsaw comprising:
a motor operably coupled to the chain to drive the chain at the guide bar.

4. The chainsaw of claim 3, the chainsaw comprising:
a drive system operably coupled to the machine drive device to actuate the pump apparatus.

5. The chainsaw of claim 4, wherein the drive system comprises a second motor operably coupled to the machine drive device to actuate the pump apparatus.

6. The chainsaw of claim 4, wherein the drive system comprises a gear system operably coupled to the motor to transmit power to the machine drive device to actuate the pump apparatus.

7. The chainsaw of claim 1, wherein the reservoir extends from the machine drive device perpendicular or oblique to a longitudinal extension of the guide bar.

8. The chainsaw of claim 1, wherein the reservoir comprises an attachment interface at an open end, the attachment interface forming a threaded interface releasably attachable to a corresponding attachment surface at the machine drive device.

9. The chainsaw of claim 1, the chainsaw comprising:

a reservoir housing surrounding the reservoir; and a fitting at which the reservoir housing is attachable, wherein the fitting and housing together form a locking interface configured to selectively secure the reservoir housing to the fitting.

10. The chainsaw of claim 9, wherein the locking interface forms a twist lock, a bayonet fitting, a threaded interface, a tapered fitting, a grease fitting, or a quick-disconnect fitting.

11. The chainsaw of claim 9, wherein the fitting is coupled to the body of the machine drive device.

12. The chainsaw of claim 1, wherein the reservoir comprises a compliant material allowing the reservoir to compress.

13. The chainsaw of claim 1, wherein the reservoir comprises a polyethylene material.

14. The chainsaw of claim 1, wherein the reservoir comprises a bellows configured to contract to reduce a volume within the reservoir.

15. The chainsaw of claim 1, comprising:

a seal positioned at an end of the transition body at which the transition body is received at the body of the machine drive device at the attachment interface.

\*    \*    \*    \*    \*